US012672171B2

(12) United States Patent
Kwak et al.

(10) Patent No.: US 12,672,171 B2
(45) Date of Patent: Jun. 30, 2026

(54) RANDOM ACCESS TIMELINE FOR A REDUCED CAPABILITY DEVICE

(71) Applicant: QUALCOMM Incorporated, San Diego, CA (US)

(72) Inventors: Yongjun Kwak, San Diego, CA (US); Muhammad Nazmul Islam, Littleton, MA (US); Hung Dinh Ly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 712 days.

(21) Appl. No.: 18/164,383

(22) Filed: Feb. 3, 2023

(65) Prior Publication Data

US 2024/0267952 A1 Aug. 8, 2024

(51) Int. Cl.
*H04W 74/0833* (2024.01)
*H04W 74/04* (2009.01)

(52) U.S. Cl.
CPC ....... *H04W 74/0833* (2013.01); *H04W 74/04* (2013.01)

(58) Field of Classification Search
CPC ........................ H04W 74/0833; H04W 74/04
See application file for complete search history.

(56) References Cited

U.S. PATENT DOCUMENTS

| | | | |
|---|---|---|---|
| 2023/0217498 A1* | 7/2023 | Lee .................. | H04W 74/0833 |
| | | | 370/329 |
| 2024/0224336 A1* | 7/2024 | Prasad ............. | H04W 74/0833 |
| 2025/0151118 A1* | 5/2025 | Qiao ....................... | H04W 8/22 |
| 2025/0261179 A1* | 8/2025 | Wang ................ | H04W 72/0453 |

OTHER PUBLICATIONS

Chen T., et al., "On eRedCap UE Complexity Reduction", MediaTek Inc, R1-2212246, 3GPP TSG RAN WG1 #111, Type Discussion, NR Redcap_Enh-Core, 3rd Generation Partnership Project, Mobile Competence Centre, 650, Route Des Lucioles, F-06921 Sophia-Antipolis Cedex, France vol. 3GPP RAN 1, No. Toulouse, FR, Nov. 14, 2022-Nov. 18, 2022 Nov. 7, 2022, XP052222805, 18 Pages, Section 3.3, p. 12.

(Continued)

*Primary Examiner* — Yemane Mesfin
*Assistant Examiner* — Salma Ayad
(74) *Attorney, Agent, or Firm* — Holland & Hart LLP

(57) ABSTRACT

Methods, systems, and devices for wireless communication are described. A first network node may transmit, to a second network node, first information that is indicative of a bandwidth capability of the first network node and a first random access message. The second network node may transmit a second random access message in response to the first random access message and via a quantity of physical resource blocks (PRBs). The second random access message may indicate a time period for transmission, by the first network node, of a third random access message responsive to the second random access message. The time period may be based on a threshold time period associated with the bandwidth capability of the first network node, and the threshold time period may be based on the quantity of PRBs via which the second random access message is transmitted.

31 Claims, 18 Drawing Sheets

(56)           References Cited

OTHER PUBLICATIONS

International Search Report and Written Opinion—PCT/US2024/
013122—ISA/EPO—May 23, 2024.
Maki S., et al., "UE Complexity Reduction for eRedCap", Panasonic,
R1-2211099, 3GPP TSG RAN WG1 #111, Type Discussion, NR
Redcap_Enh -Core, 3rd Generation Partnership Project, Mobile
Competence Centre, 650, Route Des Lucioles, F-06921 Sophia-
Antipolis Cedex, France vol. 3GPP RAN 1, No. Toulouse, FR, Nov.
14, 2022-Nov. 18, 2022, Nov. 7, 2022, XP052221664, 6 Pages,
Sections 1, 2.1.1, 2.1.3 and 2.3, p. 1-p. 5.

\* cited by examiner 405-a 405-b

605

620
RAR

630
Feedback Message

Network
Node

Network
Node

615

*Time*

635    Time Period
T ≥ First Time Duration
+ Extension Time

640    Threshold Time
Period = First Time
Duration + Extension
Time

600

705

Network Node

Contention Resolution Message
720

730
Feedback Message

Network Node

715

*Time*

735    Time Period
T ≥ First Time Duration
+ Extension Time

740    Threshold Time
Period = First Time
Duration + Extension
Time

700

130    105    115

Network Entity

Transceiver    Antenna 1210    1215

Communications Manager

Memory

Code

1230

1225

1220

1240

Processor

1235

1205

1200

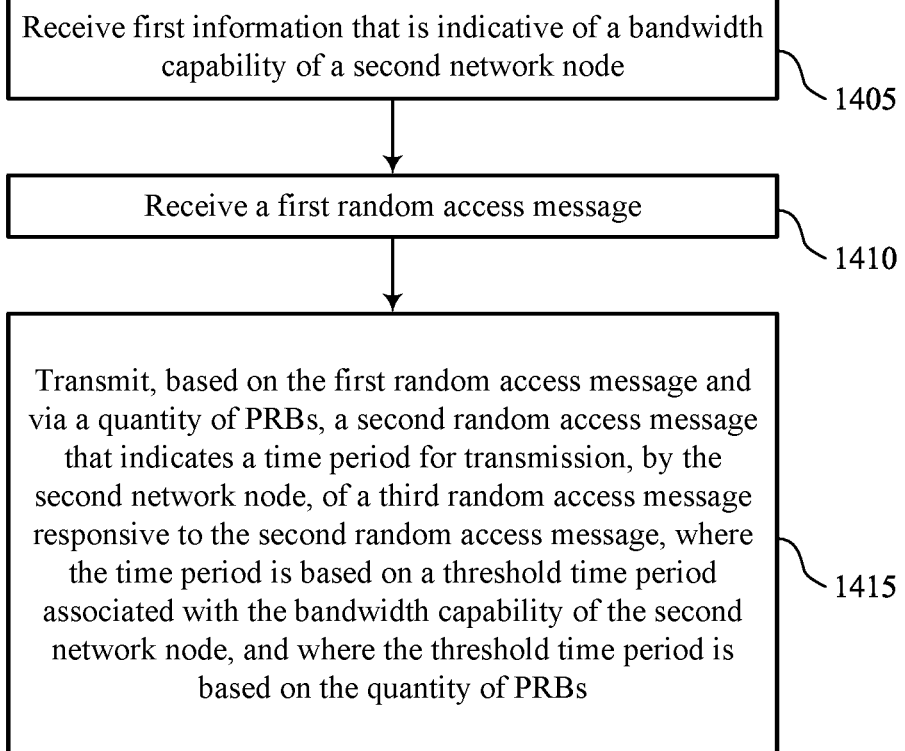

Receive first information that is indicative of a bandwidth capability of a second network node

1405

Receive a first random access message

1410

Transmit, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs

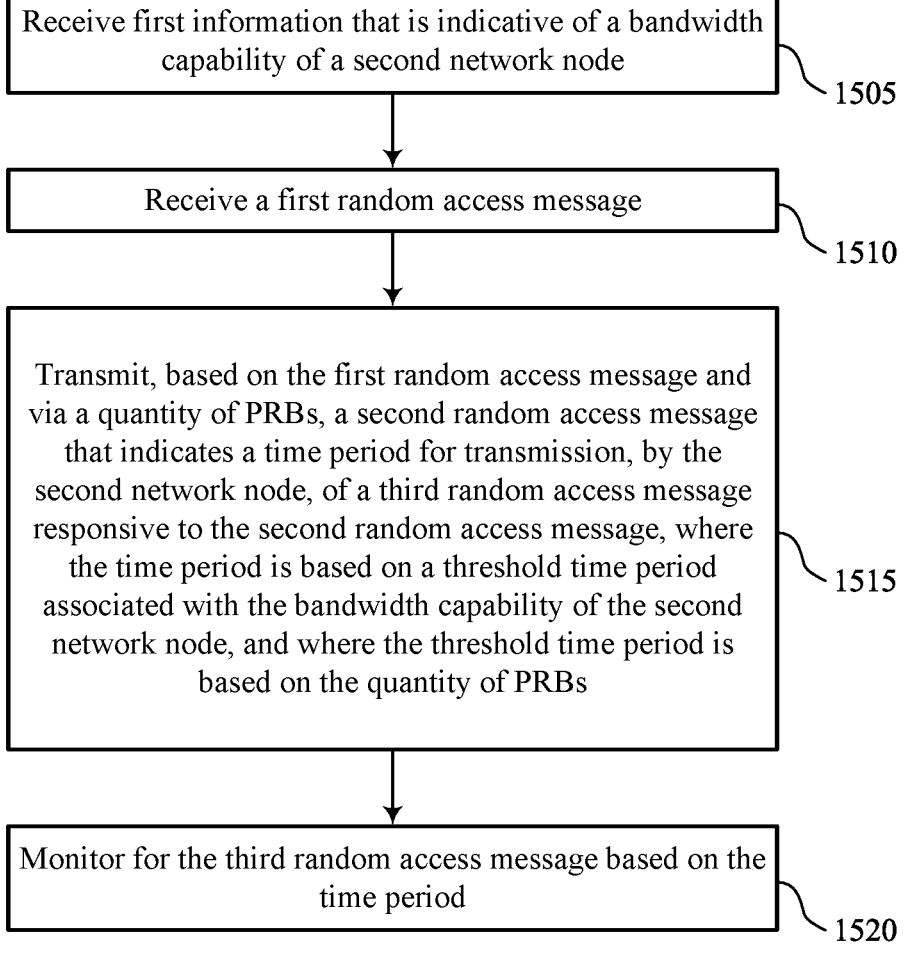

Receive first information that is indicative of a bandwidth capability of a second network node

1505

Receive a first random access message

1510

Transmit, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs

1515

Monitor for the third random access message based on the time period

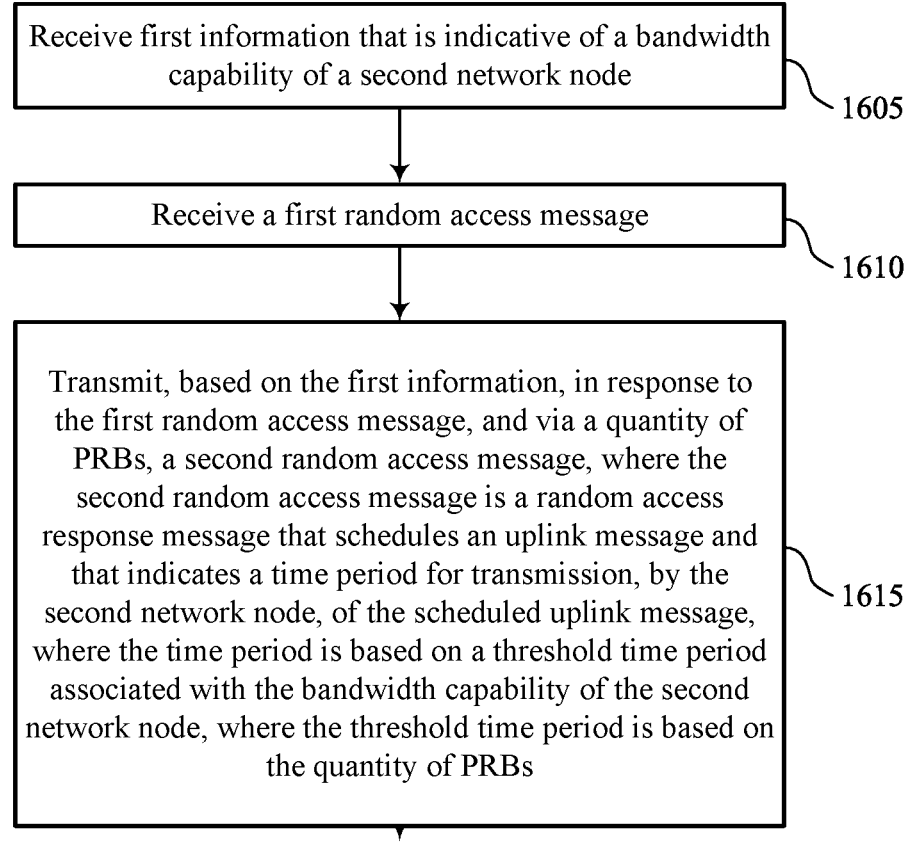

Receive first information that is indicative of a bandwidth capability of a second network node

1605

Receive a first random access message

1610

Transmit, based on the first information, in response to the first random access message, and via a quantity of PRBs, a second random access message, where the second random access message is a random access response message that schedules an uplink message and that indicates a time period for transmission, by the second network node, of the scheduled uplink message, where the time period is based on a threshold time period associated with the bandwidth capability of the second network node, where the threshold time period is based on the quantity of PRBs

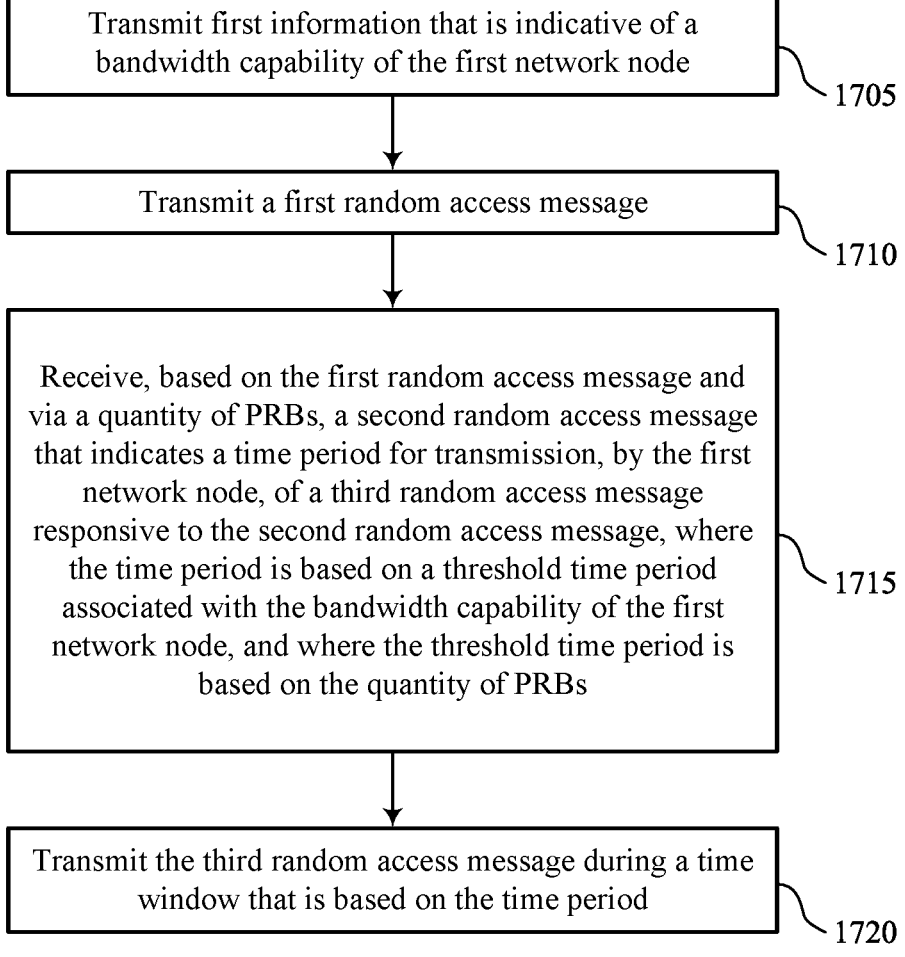

Transmit first information that is indicative of a bandwidth capability of the first network node
1705

Transmit a first random access message
1710

Receive, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs
1715

Transmit the third random access message during a time window that is based on the time period
1720

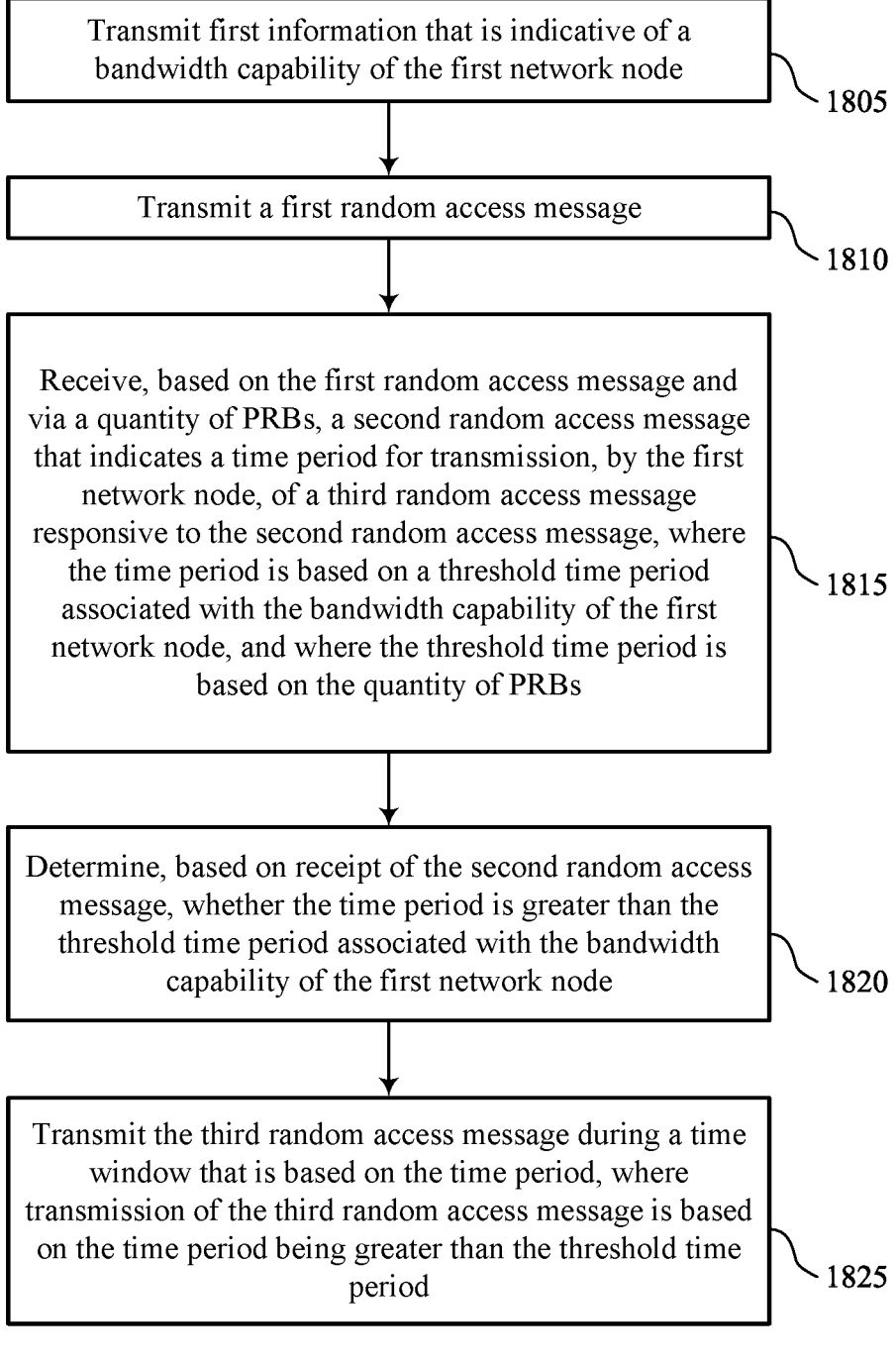

Transmit first information that is indicative of a bandwidth capability of the first network node

1805

Transmit a first random access message

1810

Receive, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs

1815

Determine, based on receipt of the second random access message, whether the time period is greater than the threshold time period associated with the bandwidth capability of the first network node

1820

Transmit the third random access message during a time window that is based on the time period, where transmission of the third random access message is based on the time period being greater than the threshold time period

RANDOM ACCESS TIMELINE FOR A REDUCED CAPABILITY DEVICE

INTRODUCTION

The following relates to wireless communications relating to timelines for random access procedures by a reduced capability wireless device. Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support a random access timeline for a reduced capability device. For example, the described techniques define an extended time period for random access procedures to accommodate for a reduced capability network node (e.g., a RedCap user equipment (UE), or some other reduced capability device) to process random access messages transmitted via more physical resource blocks (PRBs) than the reduced capability network node is designed to process per slot. The reduced capability network node may transmit, to a second network node, first information that is indicative of a bandwidth capability of the reduced capability network node. For example, the first information may indicate a threshold quantity of PRBs the reduced capability network node is capable of processing per slot. The reduced capability network node may transmit a first random access message (e.g., a MsgA, a Msg1, or a Msg3) to the second network node. The second network node may transmit a second random access message (e.g., a MsgB, a Msg2, or a Msg4) in response to the first random access message and via a quantity of PRBs. The second random access message may indicate a time period for transmission, by the reduced capability network node, of a third random access message (e.g., a Msg3, a preamble retransmission, or a feedback message) responsive to the second random access message. The time period may be based on (e.g., greater than or equal to) a threshold time period associated with the bandwidth capability of the reduced capability network node, and the threshold time period may be based on the quantity of PRBs via which the second random access message is transmitted. The reduced capability network node may transmit the third random access message in accordance with the time period. The time period may thereby accommodate for the reduced capability network node to process the second random access message received via the quantity of PRBs.

A method for wireless communication at a first network node is described. The method may include receiving first information that is indicative of a bandwidth capability of a second network node, receiving a first random access message, and transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

A first network node for wireless communication is described. The first network node may include a memory and at least one processor coupled to the memory. The at least one processor may be configured to receive first information that is indicative of a bandwidth capability of a second network node, receive a first random access message, and transmit, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

Another apparatus for wireless communication at a first network node is described. The apparatus may include means for receiving first information that is indicative of a bandwidth capability of a second network node, means for receiving a first random access message, and means for transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

A non-transitory computer-readable medium storing code for wireless communication at a first network node is described. The code may include instructions executable by a processor to receive first information that is indicative of a bandwidth capability of a second network node, receive a first random access message, and transmit, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

Some examples of the method, apparatuses, and non-transitory computer-readable medium described herein may further include operations, features, means, or instructions for monitoring for the third random access message based on the time period.

In some examples of the method, apparatuses, and non-transitory computer-readable medium described herein, the threshold time period may be based on a first time duration and an extension time, the first time duration may be based on a processing time associated with the second random access message, and the extension time may be based on the quantity of PRBs.

In some examples of the method, apparatuses, and non-transitory computer-readable medium described herein, the quantity of PRBs of the second random access message may be within a particular range of PRB quantities and the extension time may be based on the particular range of PRB quantities.

In some examples of the method, apparatuses, and non-transitory computer-readable medium described herein, the particular range of PRB quantities may be from among a set of multiple ranges of PRB quantities within a system bandwidth and each range of PRB quantities of the set of multiple ranges of PRB quantities corresponds to a respective extension time.

In some examples of the method, apparatuses, and non-transitory computer-readable medium described herein, one or more of the set of multiple ranges may be defined by a respective maximum quantity of PRBs and a respective minimum quantity of PRBs.

In some examples of the method, apparatuses, and non-transitory computer-readable medium described herein, each range of PRB quantities of the set of multiple ranges of PRB quantities includes a same quantity of PRBs representative of a fraction of a total quantity of PRBs included in the set of multiple ranges of PRB quantities.

In some examples of the method, apparatuses, and non-transitory computer-readable medium described herein, the extension time may be based on a difference between the quantity of PRBs of the second random access message and a threshold quantity.

In some examples of the method, apparatuses, and non-transitory computer-readable medium described herein, the extension time may be constant based on the quantity of PRBs of the second random access message being greater than a threshold quantity.

In some examples of the method, apparatuses, and non-transitory computer-readable medium described herein, the time period may be based on the threshold time period and the time period may be greater than or equal to the threshold time period.

In some examples of the method, apparatuses, and non-transitory computer-readable medium described herein, transmitting the second random access message may include operations, features, means, or instructions for transmitting, based on the first information and in response to the first random access message, the second random access message, where the second random access message may be a random access response (RAR) message that indicates the time period and that schedules an uplink message, where the time period may be for transmission, by the second network node, of the scheduled uplink message, and where the third random access message may be the scheduled uplink message.

In some examples of the method, apparatuses, and non-transitory computer-readable medium described herein, transmitting the second random access message may include operations, features, means, or instructions for transmitting, based on the first information and in response to the first random access message, the second random access message, where the second random access message may be a RAR message that indicates the time period and a random access preamble identifier (ID) associated with a scheduled uplink message, where the time period may be for transmission, by the second network node, of a retransmission of a random access preamble based on the random access preamble ID being different than an ID of the second network node, and where the first random access message may be the random access preamble and the third random access message may be the retransmission of the random access preamble.

In some examples of the method, apparatuses, and non-transitory computer-readable medium described herein, transmitting the second random access message may include operations, features, means, or instructions for transmitting, based on the first information and in response to the first random access message, the second random access message, where the second random access message may be a RAR message that indicates the time period and a success of a random access procedure, where the time period may be for transmission, by the second network node, of a feedback message in response to the RAR message, and where the third random access message may be the feedback message.

In some examples of the method, apparatuses, and non-transitory computer-readable medium described herein, transmitting the second random access message may include operations, features, means, or instructions for transmitting, based on the first information and in response to the first random access message, the second random access message, where the second random access message may be a downlink contention resolution random access message that indicates the time period, where the time period may be for transmission, by the second network node, of a feedback message in response to the downlink contention resolution random access message, and where the third random access message may be the feedback message.

In some examples of the method, apparatuses, and non-transitory computer-readable medium described herein, the first random access message includes the first information indicative of the bandwidth capability of the second network node.

In some examples of the method, apparatuses, and non-transitory computer-readable medium described herein, the bandwidth capability of the second network node includes a reduced capability associated with a threshold quantity of PRBs that the second network node processes during a slot.

A method for wireless communication at a first network node is described. The method may include transmitting first information that is indicative of a bandwidth capability of the first network node, transmitting a first random access message, receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs, and transmitting the third random access message during a time window that is based on the time period.

A first network node for wireless communication is described. The first network node may include a memory and at least one processor coupled to the memory. The at least one processor may be configured to transmit first information that is indicative of a bandwidth capability of the first network node, transmit a first random access message, receive, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs, and transmit the third random access message during a time window that is based on the time period.

Another apparatus for wireless communication at a first network node is described. The apparatus may include means for transmitting first information that is indicative of a bandwidth capability of the first network node, means for transmitting a first random access message, means for receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs, and means for transmitting the third random access message during a time window that is based on the time period.

A non-transitory computer-readable medium storing code for wireless communication at a first network node is described. The code may include instructions executable by a processor to transmit first information that is indicative of a bandwidth capability of the first network node, transmit a first random access message, receive, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs, and transmit the third random access message during a time window that is based on the time period.

Some examples of the method, apparatuses, and non-transitory computer-readable medium described herein may further include operations, features, means, or instructions for determining, based on receipt of the second random access message, whether the time period may be greater than the threshold time period associated with the bandwidth capability of the first network node, where transmission of the third random access message may be based on the time period being greater than the threshold time period.

In some examples of the method, apparatuses, and non-transitory computer-readable medium described herein, the threshold time period may be based on a first time duration and an extension time, the first time duration may be based on a processing time associated with the second random access message, and the extension time may be based on the quantity of PRBs.

In some examples of the method, apparatuses, and non-transitory computer-readable medium described herein, the quantity of PRBs of the second random access message may be within a particular range of PRB quantities and the extension time may be based on the particular range of PRB quantities.

In some examples of the method, apparatuses, and non-transitory computer-readable medium described herein, the particular range of PRB quantities may be from among a set of multiple ranges of PRB quantities within a system bandwidth and each range of PRB quantities of the set of multiple ranges of PRB quantities corresponds to a respective extension time.

In some examples of the method, apparatuses, and non-transitory computer-readable medium described herein, one or more of the set of multiple ranges may be defined by a respective maximum quantity of PRBs and a respective minimum quantity of PRBs.

In some examples of the method, apparatuses, and non-transitory computer-readable medium described herein, each range of PRB quantities of the set of multiple ranges of PRB quantities includes a same quantity of PRBs representative of a fraction of a total quantity of PRBs included in the set of multiple ranges of PRB quantities.

In some examples of the method, apparatuses, and non-transitory computer-readable medium described herein, the extension time may be based on a difference between the quantity of PRBs of the second random access message and a threshold quantity.

In some examples of the method, apparatuses, and non-transitory computer-readable medium described herein, the extension time may be constant based on the quantity of PRBs of the second random access message being greater than a threshold quantity.

In some examples of the method, apparatuses, and non-transitory computer-readable medium described herein, receiving the second random access message may include operations, features, means, or instructions for receiving, based on the first information and in response to the first random access message, the second random access message, where the second random access message may be a RAR message that indicates the time period and that schedules an uplink message, where time period may be for transmission, by the first network node, of the scheduled uplink message, and where the third random access message may be the scheduled uplink message.

In some examples of the method, apparatuses, and non-transitory computer-readable medium described herein, receiving the second random access message may include operations, features, means, or instructions for receiving, based on the first information, the second random access message, where the second random access message may be a RAR message that indicates the time period and a random access preamble ID associated with a scheduled uplink message, where the time period may be for transmission, by the first network node, of a random access preamble based on the random access preamble ID being different than an ID of the first network node, and where the third random access message may be the random access preamble.

In some examples of the method, apparatuses, and non-transitory computer-readable medium described herein, receiving the second random access message may include operations, features, means, or instructions for receiving, based on the first information and in response to the first random access message, the second random access message, where the second random access message may be a RAR message that indicates the time period and a success of a random access procedure, where the time period may be for transmission, by the first network node, of a feedback message in response to the RAR message, and where the third random access message may be the feedback message.

In some examples of the method, apparatuses, and non-transitory computer-readable medium described herein, receiving the second random access message may include operations, features, means, or instructions for receiving, based on the first information and in response to the first random access message, the second random access message, where the second random access message may be a downlink contention resolution random access message that indicates the time period, where the time period may be for transmission, by the first network node, of a feedback message in response to the downlink contention resolution random access message, and where the third random access message may be the feedback message.

In some examples of the method, apparatuses, and non-transitory computer-readable medium described herein, the first random access message includes the first information indicative of the bandwidth capability of the first network node.

In some examples of the method, apparatuses, and non-transitory computer-readable medium described herein, the bandwidth capability of the first network node includes a reduced capability associated with a threshold quantity of PRBs that the first network node processes during a slot.

BRIEF DESCRIPTION OF THE DRAWINGS

FIGS. 14 through 18 illustrate flowcharts showing methods that support a random access timeline for a reduced capability device in accordance with one or more aspects of the present disclosure.

DETAILED DESCRIPTION

Figure 1:
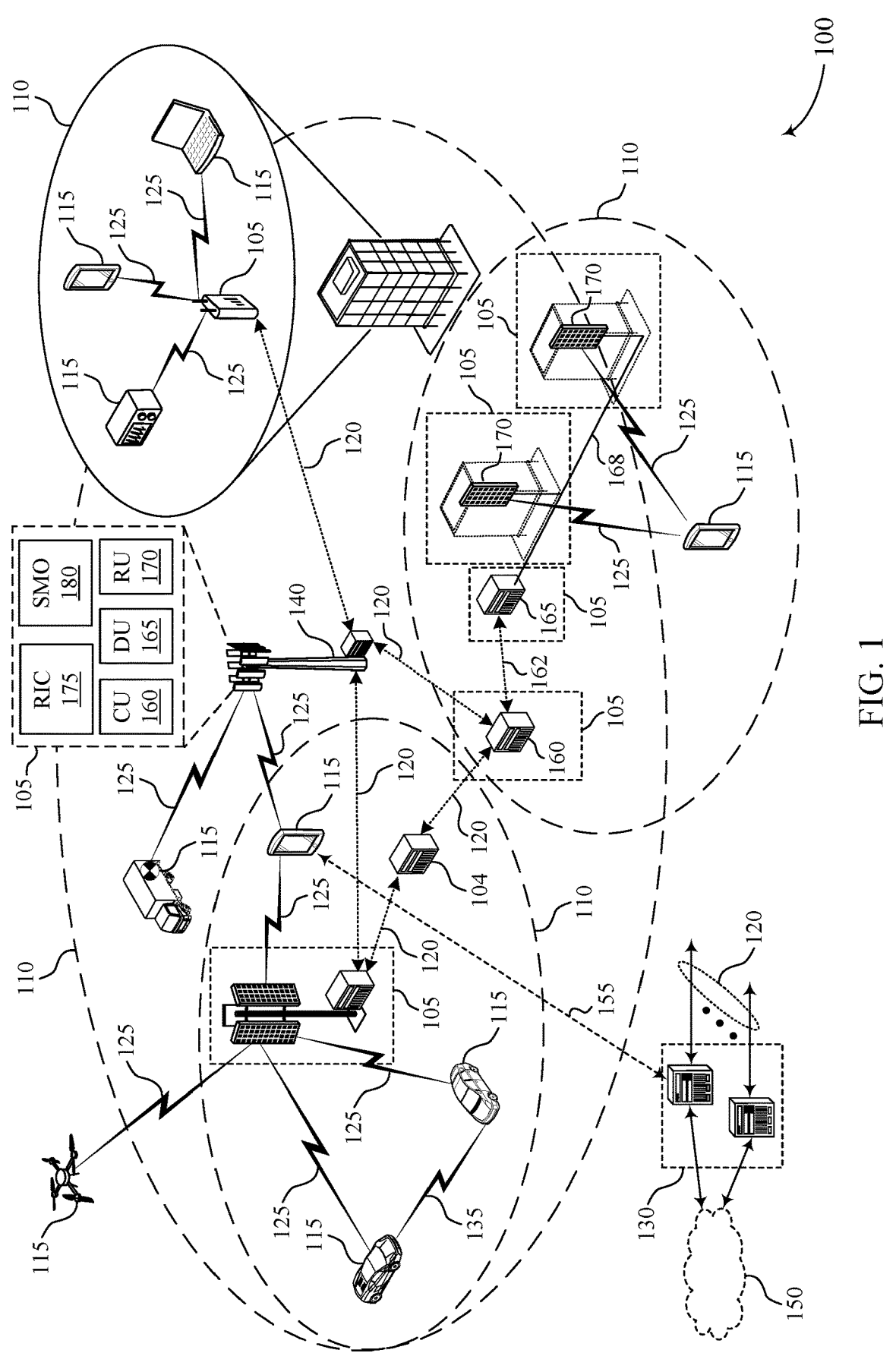
FIG. 1 illustrates an example of a wireless communications system that supports a random access timeline for a reduced capability device in accordance with one or more aspects of the present disclosure.

In some wireless communication systems, a first network node and a second network node (e.g., a user equipment (UE) and a network entity, or some other types of network nodes) may perform a random access procedure to establish a connection. The procedure may be a two-step or four-step random access procedure. If the first network node is a reduced capability network node (e.g., an eRedCap UE or some other type of reduced capability), the first network node may support communications within a given bandwidth, which may be narrower than a radio frequency (RF) bandwidth for communications with other devices. As a result of this reduced capability, the first network node may also be limited in a quantity of physical resource blocks (PRBs) that the first network node is able to process during a single slot. As an example, some wireless communications systems may agree that a reduced capability device may be expected to be able to process 25 PRBs per slot or less (e.g., or some other quantity of PRBs, where the quantity of PRBs may vary based on one or more communication parameters, including a subcarrier spacing (SCS) supported by the device). If the first network node receives a downlink random access message via a quantity of PRBs that is greater than the threshold quantity of PRBs, the first network node may take more time (or slots) to process the message. However, downlink random access messages may also indicate a time duration during which the first network node is expected to respond. A first network node that takes more time to process (and thus respond) to a downlink random access message may require more time than is indicated via the downlink random access message.

Techniques, systems, and devices described herein define an extended time period for random access procedures to accommodate for a reduced capability network node to process random access messages transmitted via more PRBs than the network node is designed to process per slot. The reduced capability network node (a first network node) may indicate that it is a reduced capability network node to a second network node via one or more messages. The first network node may transmit a first message of a random access procedure (e.g., either a Msg1 for a four-step random access procedure or a MsgA for a two-step random access procedure) after or at the same time as indicating the reduced capability. As part of the random access procedure, the second network node may respond to the initial message from the first network node and may transmit a random access response (RAR) message via a quantity of PRBs that is greater than the threshold quantity of PRBs supported by the first network node (for per slot processing). The RAR message may indicate a time period for the first network node to process the RAR message and transmit a responsive message. The time period may be determined by the second network node. The time period may relaxed or extended in order to account for expected longer processing time of the first network node based on the indication of the reduced capability. Thus, the time period may be determined to be equal to or longer than a threshold time, where the threshold time includes a first duration of time and an extension time. The first duration of time may be based on a processing time associated with the RAR message. The extension time may be based on the quantity of PRBs used by the second network node for transmitting the RAR message. For example, the extension time may be incrementally varied based on the quantity of PRBs or may be a constant value if the quantity of PRBs exceeds the threshold quantity able to be processed by the first network node per slot.

The described time period extension may be applied to multiple time periods, and not just in response to an RAR message. For example, the described time period extension may be applied between reception of an RAR by the first network node and transmission of an uplink message scheduled by the RAR (e.g., a Msg3 in a four-step random access procedure), or between reception of an RAR by the first network node and a retransmission of a random access preamble (e.g., a Msg1) if the RAR includes a random access preamble identifier (RAPID) that does not match an ID of the first network node, or between reception of an RAR indicating a successful two-step random access procedure and transmission of a feedback message by the first network node or between reception of a downlink contention resolution message (e.g., a Msg4 in a four-step random access procedure) and transmission of a feedback message by the first network node. The second network node may thereby be able to transmit a random access message (e.g., an RAR or a downlink contention resolution message) via an increased bandwidth and may extend or relax a scheduled time window for the first network node to respond to the random access message to provide time for the first network node to process the random access message received via the increased bandwidth.

Aspects of the disclosure are initially described in the context of wireless communications systems. Additional aspects are described with reference to bandwidth configurations, random access timelines, and process flows. Aspects of the disclosure are further illustrated by and described with reference to apparatus diagrams, system diagrams, and flowcharts that relate to a random access timeline for a reduced capability device.

FIG. 1 illustrates an example of a wireless communications system 100 that supports a random access timeline for a reduced capability device in accordance with one or more aspects of the present disclosure. The wireless communications system 100 may include one or more network entities 105, one or more UEs 115, and a core network 130. In some aspects, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some aspects, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node (which may be referred to as a node, a network node, a network entity 105, or a wireless node) may include, be, or be included in (e.g., be a component of) a base station 140 (e.g., any base station 140 described herein), a UE 115 (e.g., any UE 115 described herein), a network controller, an apparatus, a device, a computing system, an integrated access and backhauling (IAB) node, a distributed unit (DU) 160, a central unit (CU) 165, a remote/radio unit (RU) 170 (which may also be referred to as a remote radio unit (RRU)), and/or another processing entity configured to perform any of the techniques described herein. For example, a network node may be a UE 115. As another example, a network node may be a base station 140 or network entity 105. As another example, a first network node may be configured to communicate with a second network node or a third network node. In one aspect of this example, the first network node may be a UE 115, the second network node may be a base station 140, and the third network node may be a UE 115. In another aspect of this example, the first network node may be a UE 115, the second network node may be a base station 140, and the third network node may be a base station 140. In yet other aspects of this example, the first, second, and third network nodes may be different relative to these examples. Similarly, reference to a UE 115, base station 140, apparatus, device, computing system, or the like may include disclosure of the UE 115, base station 140, apparatus, device, computing system, or the like being a network node. For example, disclosure that a UE 115 is configured to receive information from a base station 140 also discloses that a first network node is configured to receive information from a second network node. Consistent with this disclosure, once a specific example is broadened in accordance with this disclosure (e.g., a UE 115 is configured to receive information from a base station 140 also discloses that a first network node is configured to receive information from a second network node), the broader example of the narrower example may be interpreted in the reverse, but in a broad open-ended way. In the example above where a UE 115 is configured to receive information from a base station 140 also discloses that a first network node is configured to receive information from a second network node, the first network node may refer to a first UE 115, a first base station, a first apparatus, a first device, a first computing system, a first set of one or more one or more components, a first processing entity, or the like configured to receive the information; and the second network node may refer to a second UE 115, a second base station 140, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

In some aspects, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some aspects, network entities 105 may communicate with one another via a backhaul communication link 120 (e.g., in accordance with an X2, Xn, or other interface protocol) either directly (e.g., directly between network entities 105) or indirectly (e.g., via a core network 130). In some aspects, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some aspects, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some aspects, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some aspects, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some aspects, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some aspects, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some aspects, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support a random access timeline for a reduced capability device as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some aspects, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some aspects, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some aspects, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some aspects, the wireless communications system 100 may include network entities 105 or UEs 115 that support concurrent communications using carriers associated with multiple carrier bandwidths. In some aspects, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta$f) and a cyclic prefix. A carrier may be divided into one or more BWPs having the same or different numerologies. In some aspects, a UE 115 may be configured with multiple BWPs. In some aspects, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of Ts=1/ ($\Delta f_{max} \cdot N_f$) seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some aspects, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some aspects, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some aspects, a cell also may refer to a coverage area 110 or a portion of a coverage area 110 (e.g., a sector)

over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some aspects, a carrier may support multiple cells, and different cells may be configured according to different protocol types (e.g., MTC, narrow band IoT (NB-IoT), enhanced mobile broadband (eMBB)) that may provide access for different types of devices.

In some aspects, a network entity 105 (e.g., a base station 140, an RU 170) may be movable and therefore provide communication coverage for a moving coverage area 110. In some aspects, different coverage areas 110 associated with different technologies may overlap, but the different coverage areas 110 may be supported by the same network entity 105. In some other aspects, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some aspects, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some aspects, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some aspects, half-duplex communications may be performed at a reduced peak rate. Other power conservation techniques for the UEs 115 include entering a power saving deep sleep mode when not engaging in active communications, operating using a limited bandwidth (e.g., according to narrow band communications), or a combination of these techniques. For example, some UEs 115 may be configured for operation using a narrow band protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some aspects, a UE 115 may be configured to support communicating directly with other UEs 115 via a device-to-device (D2D) communication link 135 (e.g., in accordance with a peer-to-peer (P2P), D2D, or sidelink protocol). In some aspects, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some aspects, one or more UEs 115 of such a group may be outside the coverage area 110 of a network entity 105 or may be otherwise unable to or not configured to receive transmissions from a network entity 105. In some aspects, groups of the UEs 115 communicating via D2D communications may support a one-to-many (1:M) system in which each UE 115 transmits to each of the other UEs 115 in the group. In some aspects, a network entity 105 may facilitate the scheduling of resources for D2D communications. In some other aspects, D2D communications may be carried out between the UEs 115 without an involvement of a network entity 105.

In some systems, a D2D communication link 135 may be an example of a communication channel, such as a sidelink communication channel, between vehicles (e.g., UEs 115). In some aspects, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some aspects, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 MHz to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some aspects, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some aspects, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some aspects, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some aspects, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some aspects, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some aspects, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some aspects, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some aspects, a device may support same-slot HARQ feedback, in which case the device may provide HARQ feedback in a specific slot for data received via a previous symbol in the slot. In some other aspects, the device may provide HARQ feedback in a subsequent slot, or according to some other time interval.

Some devices in the wireless communications system 100 may be reduced capability devices. Such devices may be associated with various capabilities that are different than (e.g., less than) capabilities of other devices in the wireless communications system 100 to support low latency and low complexity use cases (e.g., low-tier IoT use cases, or other use cases). The reduced capability devices may be designed to minimize device complexity and reduce device cost by relaxing peak throughput, latency, and reliability requirements, among other examples. Some reduced capability devices may support a reduced bandwidth capability, where a bandwidth supported by the reduced capability device may be reduced from a baseline system or RF bandwidth. As an example, some UEs 115 may support a first bandwidth (e.g., a 100 MHz bandwidth or a system bandwidth), a first tier or group of reduced capability UEs 115 (RedCap UEs 115) may support a second bandwidth that is less than the first bandwidth (e.g., a 20 MHz BW, or some other reduced bandwidth), and a second tier or group of reduced capability UEs 115 (e.g., eRedCap UEs 115) may support a third bandwidth that is less than the first and second bandwidths (e.g., baseband bandwidth complexity may be reduced by restricting a quantity of PRBs that the second tier or group of reduced capability UEs 115 may process per slot).

A first network node and a second network node (e.g., a UE 115 and a network entity 105, or some other types of network nodes) in the wireless communications system 100 may perform a random access procedure to establish a connection. The procedure may be a two-step or four-step random access procedure. If the first network node is a reduced capability network node (e.g., an eRedCap UE 115 or some other type of reduced capability), the first network node may support communications within a given bandwidth, which may be narrower than an RF bandwidth for communications with other devices in the wireless communications system. As a result of this reduced capability, the first network node may also be able to process no more than a threshold quantity of PRBs during a single slot. If the first network node receives a downlink random access message via a quantity of PRBs that is greater than the threshold quantity of PRBs, the first network node may take more time (or slots) to process the message. However, downlink random access messages may also indicate a time duration during which the first network node is expected to respond. A first network node that takes more time to process (and thus respond) to a downlink random access message may require more time than is indicated via the downlink random access message.

Techniques, systems, and devices described herein define an extended time period for random access procedures to accommodate for a reduced capability network node to process random access messages transmitted via more PRBs than the reduced capability network node is designed to process per slot. The reduced capability network node (a first network node) may transmit, to a second network node, first information that is indicative of a bandwidth capability of the first network node. For example, the first information may indicate a threshold quantity of PRBs the first network node is capable of processing per slot. The first network node may transmit a first random access message (e.g., a MsgA, a Msg1, or a Msg3) to the second network node. The second network node may transmit a second random access message (e.g., a MsgB, a Msg2, or a Msg4) in response to the first random access message and via a quantity of PRBs. The second random access message may indicate a time period for transmission, by the first network node, of a third random access message (e.g., a Msg3, a preamble retransmission, or a feedback message) responsive to the second random access message. The time period may be based on (e.g., greater than or equal to) a threshold time period associated with the bandwidth capability of the first network node, and the threshold time period may be based on the quantity of PRBs via which the second random access message is transmitted. The first network node may transmit the third random access message in accordance with the time period. The time period may thereby accommodate for the first network node to process the second random access message received via the quantity of PRBs.

Figure 2:
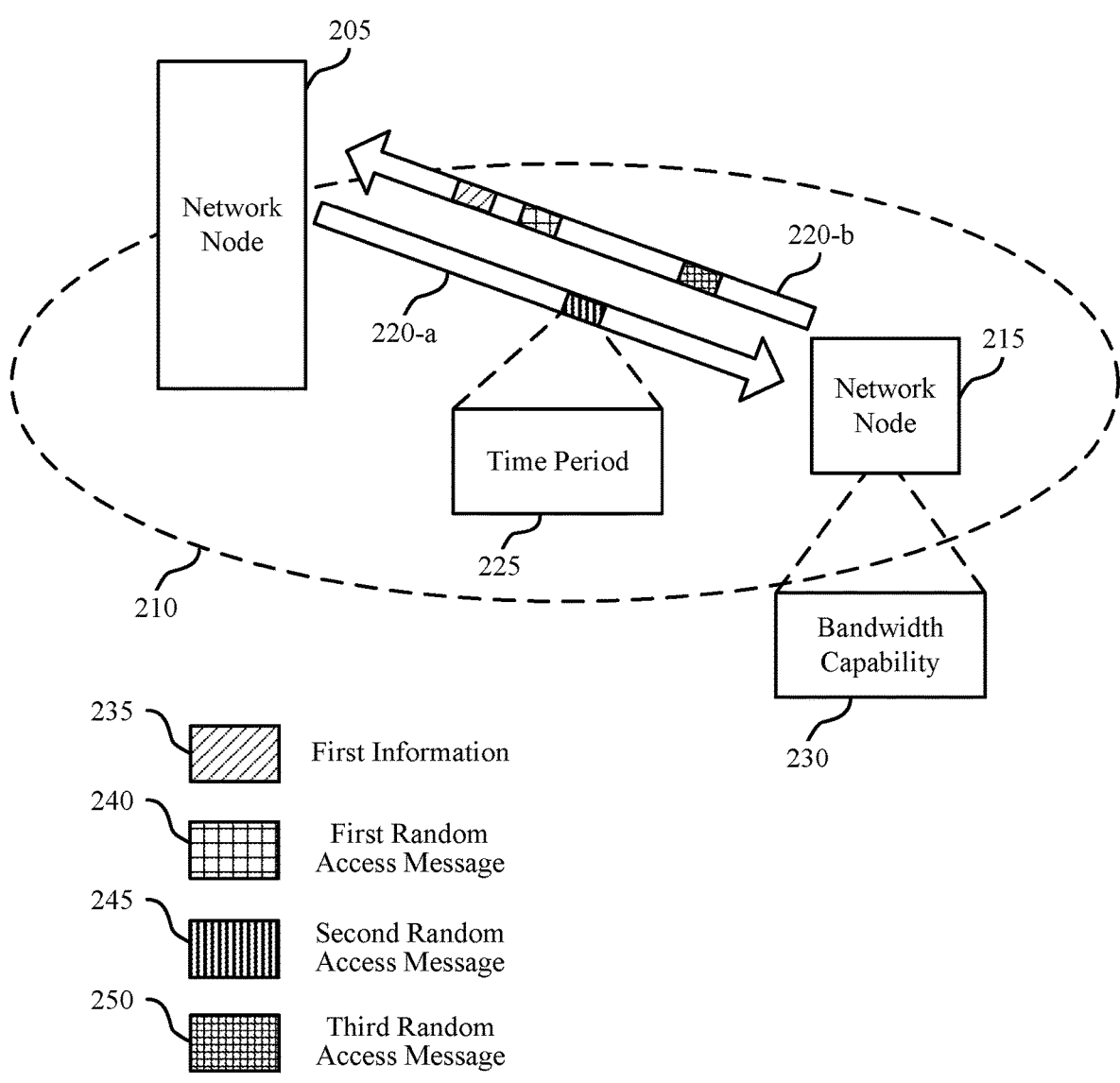
FIG. 2 illustrates an example of a wireless communications system that supports a random access timeline for a reduced capability device in accordance with one or more aspects of the present disclosure.

FIG. 2 illustrates an example of a wireless communications system 200 that supports a random access timeline for a reduced capability device in accordance with one or more aspects of the present disclosure. The wireless communications system 200 may implement or be implemented by aspects of the wireless communications system 100 as described with reference to FIG. 1. For example, the wireless communications system 200 may include a network node 205 and a network node 215, which may represent examples of corresponding devices as described with reference to FIG. 1. The network node 205 and the network node 215 may each represent an example of a UE 115, a network entity 105, a base station, an IAB node, or some other device. The network node 205 may communicate with the network node 215 within a geographic coverage area 210 and via a downlink communication link 220-*a* and an uplink communication link 220-*b*. The network node 205 and the network node 215 may support an extended time period for random access procedures to accommodate for the network node 215 (e.g., a reduced capability network node 215) to process random access messages transmitted via more PRBs than the network node 215 is designed to process per slot.

In some aspects, a bandwidth capability 230 of the network node 215 may be associated with a reduced capability. For example, based on the bandwidth capability 230, the network node 215 may support communications received via no more than a threshold bandwidth. That is, to reduce complexity and cost, a quantity of PRBs that the network node 215 is able to process per slot (or other time period) may be less than a threshold quantity, which may be referred to as baseband complexity reduction, as described with reference to FIG. 1. In some aspects, the threshold quantity of PRBs that the network node 215 can process per slot may apply to a subset of communication types (e.g., unicast communications), as described in further detail elsewhere herein, including with reference to FIG. 3. The network node 215 may transmit first information 235 to the network node 205 via the uplink communication link 220-*b* to indicate the bandwidth capability 230 of the network node 215. In some aspects, the first information 235 may be transmitted via a random access message, or some other type of uplink message or signaling.

The network node 215 may transmit a first random access message 240 to the network node 205 via the uplink communication link 220-*b* after or at the same time as transmitting the first information 235. For example, the first random access message 240 may, in some aspects, convey the first information 235. The first random access message 240 may be transmitted as part of a random access procedure between the network node 205 and the network node 215. The random access procedure may be a two-step or a four-step random access procedure. The first random access message 240 may be, for example, a random access preamble (e.g., MsgA in a two-step random access procedure or Msg1 in a four-step random access procedure), an uplink message (e.g., Msg3 in a four-step random access procedure), or some other type of random access message.

The network node 205 may receive the first information 235 and the first random access message 240 and may transmit a second random access message 245 via the downlink communication link 220-*a* in response to the first random access message 240. The second random access message 245 may be, for example, an RAR (e.g., a MsgB in a two-step random access procedure or a Msg2 in a four-step random access procedure), a downlink contention resolution message (e.g., Msg4 in a four-step random access procedure), or some other type of random access message. The second random access message 245 may indicate a time period 225 associated with transmission, by the network node 215, of a third random access message 250 responsive to the second random access message 245. In some cases, the time period 225 may be based on a first time duration associated with processing and uplink preparation by the network node 215, as described in further detail elsewhere herein, including with reference to FIG. 4A.

The wireless communications system 200 may permit the network node 205 to transmit the second random access message 245 to the network node 215 via a quantity of PRBs that is greater than the threshold quantity of PRBs associated with the bandwidth capability 230 of the network node 215. In some cases, if the network node 205 transmits the second random access message 245 via a quantity of PRBs that is greater than the threshold quantity, and the second random access message 245 indicates the time period 225 based on the first time duration, the network node 215 may not be capable of processing the second random access message 245 during the time period 225. As such, the network node 215 may not be able to transmit the third random access message 250 at the scheduled time, which may reduce throughput and increase latency of the random access procedure.

Techniques, systems, and devices described herein define an extended time period 225 that accounts for additional processing time at the network node 215 based on the bandwidth capability 230 and a quantity of PRBs via which the second random access message 245 is transmitted and received. For example, the described techniques define a threshold time period associated with the bandwidth capability 230 (e.g., for reduced capability devices). The threshold time period may be based on the first time duration associated with processing and/or uplink preparation by the network node 215 and an extension time. The extension time may be based on the quantity of PRBs allocated for the second random access message 245. For example, the extension time may be a constant time period if the quantity of PRBs exceeds the threshold quantity supported by the reduced capability network node 215, or the extension time may be based on a difference between the quantity of PRBs and the threshold quantity, as described in further detail elsewhere herein, including with reference to FIGS. 4-7.

The network node 205, the network node 215, or both may determine (e.g., estimate or calculate) the threshold time period corresponding to the bandwidth capability 230 of the network node 215. In some aspects, rules or procedures for defining or calculating the threshold time period may be configured (e.g., pre-configured or defined in a standard) or may be indicated via signaling exchanged between the network node 205 and the network node 215, or both. After receiving the first information 235 indicative of the bandwidth capability 230 of the network node 215 and the first random access message 240, the network node 205 may determine a time period 225 to indicate via the second random access message 245 based on the threshold time period. For example, the network node 205 may determine a time period 225 that is greater than or equal to the threshold time period, such that the network node 215 may have sufficient time to receive and respond to the second random access message 245.

In some aspects, the network node 215 may receive the second random access message 245 indicating the time period 225, and the network node 215 may verify the time period 225 before responding. For example, the network node 215 may determine whether the time period 225 is greater than the threshold time period associated with the bandwidth capability 230. If the time period 225 is not greater than the threshold time period, the network node 215 may refrain from transmitting the third random access message 250. If the time period 225 is greater than or equal to the threshold time period, the network node 215 may transmit the third random access message 250 within a time window that is based on the time period 225.

A threshold time period may thereby be defined for reduced capability network nodes and may be based on a bandwidth over which a random access message is received. By accounting for the bandwidth (a quantity of PRBs) over which the random access message is received, the threshold time period may be extended if a quantity of PRBs increases and may be reduced if the quantity of PRBs decreases (e.g., below a threshold quantity of PRBs associated with the bandwidth capability 230). The network node 205 may determine a time period 225 between reception of a second random access message 245 and transmission of a responsive random access message based on the threshold time period, which may provide for a reduced capability network node to be able to accurately process and respond to the second random access message 245 regardless of a quantity of PRBs via which the second random access message 245 is transmitted.

Figures 3A, 3B:
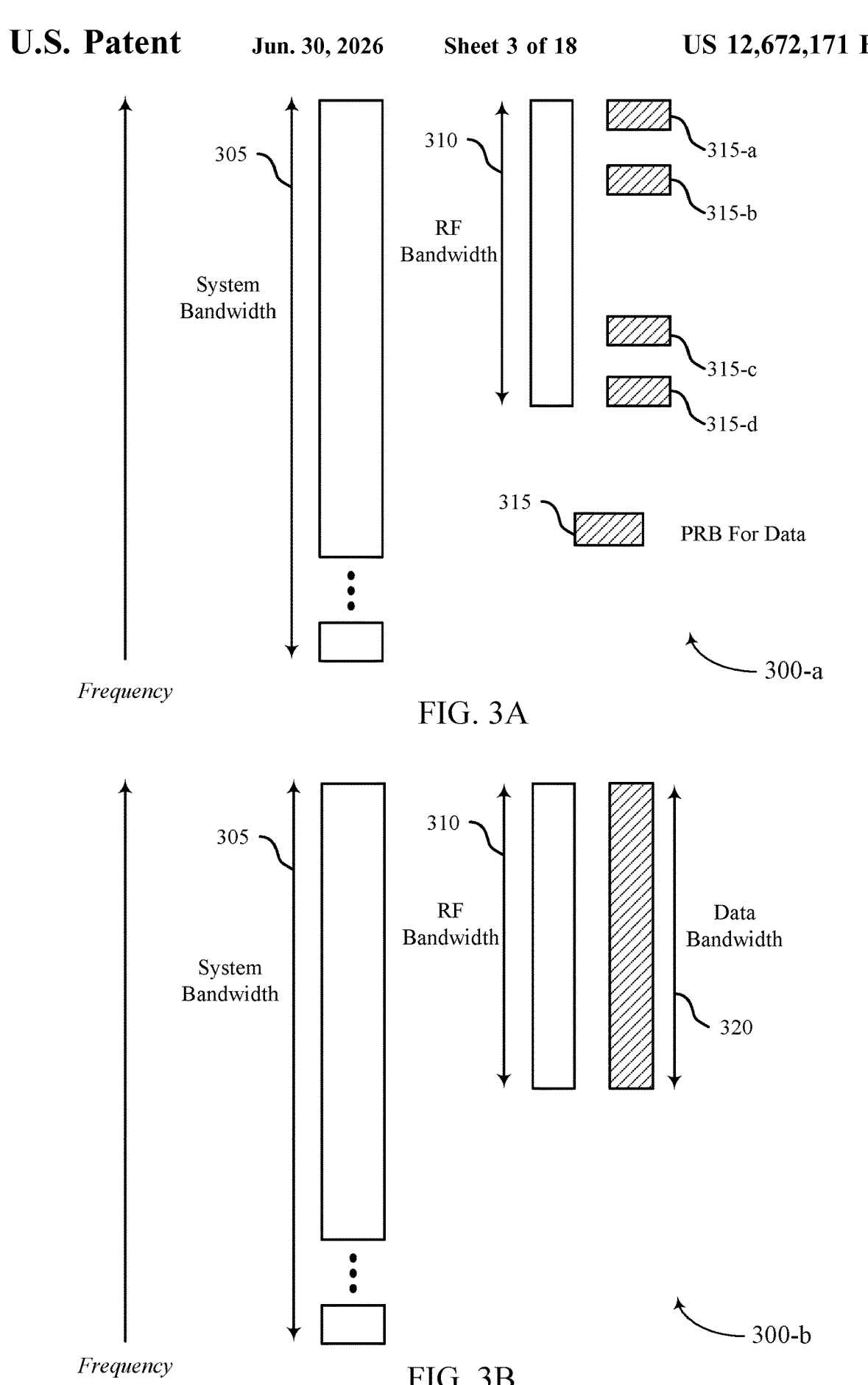
FIGS. 3A and 3B illustrate examples of bandwidth configurations that support a random access timeline for a reduced capability device in accordance with one or more aspects of the present disclosure.

FIGS. 3A and 3B illustrate examples of bandwidth configurations 300-a and 300-b that support a random access timeline for a reduced capability device in accordance with one or more aspects of the present disclosure. The bandwidth configurations 300-a and 300-b may implement or be implemented by aspects of the wireless communications systems 100 and 200, as described with reference to FIGS. 1 and 2. For example, the bandwidth configurations 300-a and 300-b illustrate resources in a frequency domain that may be allocated for communications by a network node, which may represent an example of a reduced capability network node as described with reference to FIGS. 1 and 2.

FIG. 3A illustrates a first bandwidth configuration 300-a for unicast communications (e.g., unicast PDSCH) at the reduced capability network node. The bandwidth configuration 300-a includes a system bandwidth 305, which may represent a range of frequency resources allocated for wireless communications by devices in the wireless communications system. The RF bandwidth 310 may represent a portion of the system bandwidth 305 that includes frequency resources allocated for data transmissions and receptions by a network node that does not have the reduced capabilities of the reduced capability network node described herein. For example, one or more non-reduced capability network nodes may monitor for, receive, and process downlink transmissions via the RF bandwidth 310 (e.g., a 20 MHz bandwidth, or some other bandwidth).

As described with reference to FIGS. 1 and 2, to reduce complexity and cost, a reduced capability network node may support a reduced or restricted bandwidth, which may correspond to a threshold quantity of PRBs 315 allocated for data reception at the network node. The network node may be capable of processing no more than the threshold quantity of PRBs 315 per slot. In the example of FIG. 3A, the threshold quantity of PRBs 315 may include the PRBs 315-a, 315-b, 315-c, and 315-d. In some aspects, the threshold quantity of PRBs 315 may be based on an SCS of communications (e.g., the threshold quantity may be 25 PRBs 315 for an SCS of 15 kilohertz (KHz) and 11 or 12 PRBs 315 for an SCS of 30 KHz, or some other threshold quantity).

As such, unicast data transmissions to the reduced capability network node may be scheduled within a quantity of PRBs 315 of the RF bandwidth 310 that is the same as or less than the threshold quantity. It may be assumed that the reduced capability network node (e.g., an eRedCap UE, or some other type of device) is capable of baseband processing of up to the threshold quantity of PRBs 315 per slot or per hop if intra-slot frequency hopping is enabled. Unicast transmissions via a quantity of PRBs 315 that is greater than the threshold quantity may not be supported by the reduced capability network node, in some cases.

FIG. 3B illustrates a second bandwidth configuration 300-b for broadcast communications (e.g., broadcast PDSCH) at the reduced capability network node. The bandwidth configuration 300-b includes a system bandwidth 305 and an RF bandwidth 310, which may represent examples of the system bandwidth 305 and the RF bandwidth 310 described with reference to FIG. 3A.

In some aspects, broadcast channels may be shared by multiple wireless devices, including network nodes that support the RF bandwidth 310 and reduced capability network nodes that are capable of processing no more than a threshold quantity of PRBs 315 per slot. The broadcast channels may include downlink channels (e.g., physical downlink shared channels (PDSCHs)) for system information blocks (SIBs), such as SIB1, other system information (OSI), paging, and RAR, among other examples. The broadcast channels may be transmitted without restriction on a quantity of PRBs due to the shared use between different types of devices. As such, the reduced capability network node may be scheduled within the RF bandwidth 310 for broadcast communications without a restriction or reduction of the quantity of PRBs 315. For example, a data bandwidth 320 via which the reduced capability network node may receive broadcast communications may be the same as the RF bandwidth 310 (e.g., a 20 MHz bandwidth, or some other bandwidth).

As such, other network nodes may schedule broadcast communications via any quantity of PRBs 315 within the data bandwidth 320. If the broadcast communications are scheduled with a quantity of PRBs 315 greater than the threshold quantity of PRBs 315, the reduced capability network node may process the broadcast communications via a longer time period as compared with unicast communications. However, a timeline for processing and responding to a broadcast communication may be more flexible than a corresponding timeline for unicast communications. As such, the extended processing time may not affect the broadcast communications, which is why an increased data bandwidth 320 may be permitted.

In some aspects described herein, random access messages that are transmitted to the reduced capability network node may be scheduled via a quantity of PRBs 315 that is greater than the threshold quantity of PRBs 315 the network node is capable of processing per slot (e.g., the random access message may be scheduled via any quantity of PRBs 315 in the data bandwidth 320). An extended time period for transmission, by the reduced capability network node, of a responsive message may be defined to support such random access messages scheduled via an increased bandwidth. Techniques for defining the extended time period and different applicable random access timelines are described in further detail elsewhere herein, including with reference to FIGS. 4-8.

Figure 4A:
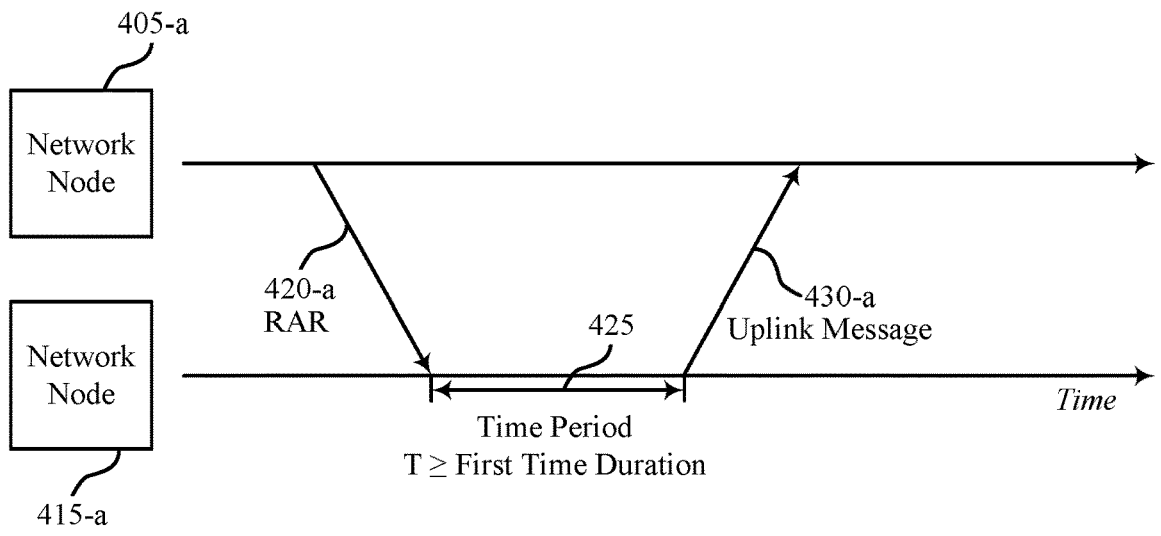
FIGS. 4A and 4B illustrate examples of random access timelines that support a random access timeline for a reduced capability device in accordance with one or more aspects of the present disclosure.
Figure 4B:
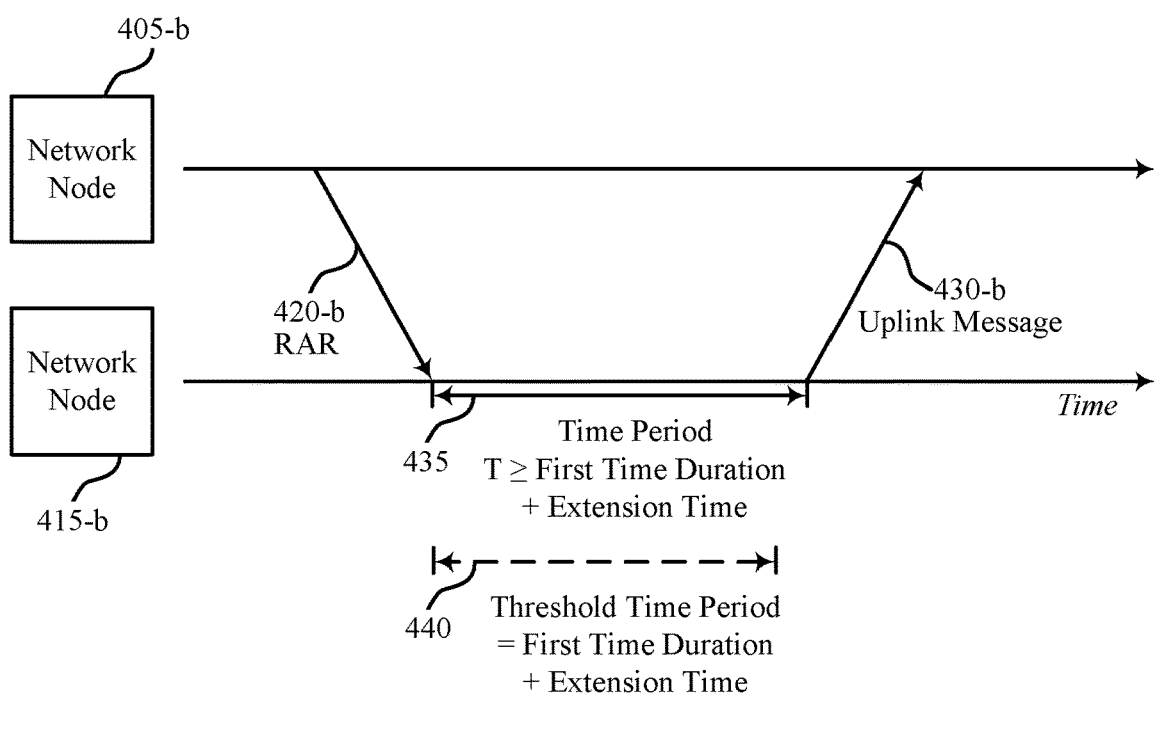

FIGS. 4A and 4B illustrate examples of random access timelines 400-a and 400-b that support a random access timeline for a reduced capability device in accordance with one or more aspects of the present disclosure. The random access timelines 400-a and 400-b may implement or be implemented by aspects of the wireless communications systems 100 and 200. For example, the random access timelines 400-a and 400-b illustrate timelines for transmission, by a network node 405, of an RAR 420, reception and processing of the RAR 420 by a network node 415, and transmission, by the network node 415, of an uplink message 430 in response to the RAR 420. The network node 405 and the network node 415 may represent examples of corresponding devices as described with reference to FIGS. 1-3. In some aspects, a quantity of PRBs via which the RAR 420 is scheduled may vary, which may or may not affect processing of the RAR 420 at the network node 415.

FIG. 4A illustrates a first random access timeline 400-a. The first random access timeline 400-a may be associated with a four-step random access procedure, in some aspects. Although not illustrated in FIG. 4A, the network node 415-a may transmit a first random access message to the network node 405-a at a time before the RAR 420-a is transmitted. The first random access message may be, for example, a random access preamble (e.g., Msg1), or some other type of random access message, and may represent an example of the first random access message 240 described with reference to FIG. 2. The network node 405-b may receive the first random access message and may transmit an RAR 420-a (e.g., Msg2) in response to the first random access message. In some aspects, the RAR 420-a may be a fallback RAR 420-a. For example, if the network node 415-a initiates a two-step random access procedure, the network node 405-a may transmit a fallback RAR 420-a to change the random access procedure from a two-step procedure to a four-step procedure.

In this example, the network node 415-a may support a non-reduced bandwidth capability. That is, the network node 415-a may be capable of receiving and processing unicast and broadcast communications within any quantity of PRBs of a system bandwidth, as described with reference to FIG. 3.

The RAR 420-a may schedule an uplink message 430-a (e.g., Msg3) and may indicate a time period 425 for transmission, by the network node 415-a, of the uplink message 430-a in response to the RAR 420-a. If the network node 415-a supports a non-reduced bandwidth capability, the time period 425 indicated via the RAR 420-a may be based on (e.g., no less than) a first time duration associated with the RAR 420-a. The first time duration may include a sum of a first processing time, $N_{T,1}$, for the network node 415-a, an uplink preparation time, $N_{T,2}$, for the network node 415-a, and a constant time duration (e.g., 0.5 ms, or some other constant value). The time period 425, T, may be greater than or equal to the first time duration, as shown in Equation 1.

$$T \geq N_{T,1} + N_{T,2} + 0.5 \text{ ms} \tag{1}$$

$N_{T,1}$ may represent a time duration, in ms, of a quantity of symbols (e.g., N1 symbols) corresponding to a PDSCH processing time for a given device processing capability (e.g., UE processing capability 1), and $N_{T,2}$ may represent a time duration in ms of a quantity of symbols (e.g., N2 symbols) corresponding to a physical uplink shared channel (PUSCH) preparation time for a given device processing capability (e.g., UE processing capability 1).

As such, the network node 405-a may determine the time period 425 to be greater than or equal to the first duration associated with processing, by the network node 415-a, the RAR 420-a. The network node 405-a may indicate the time period 425 via the RAR 420-a. The network node 415-a may receive the RAR 420-a and obtain the time period 425. The network node 415-*a* may process the RAR 420-*a* and prepare the uplink message 430-*a* during the time period 425. The network node 415-*a* may transmit the uplink message 430-*a* to the network node 405-*a* during a time window based on the time period 425 (e.g., at a time that is offset from a time at which the RAR 420-*a* is received by at least the time period 425, as illustrated in FIG. 4A). The network node 405-*a* and the network node 415-*a* may thereby perform a random access procedure in accordance with the described timeline.

In some aspects, however, the network node 415-*a* may support a reduced bandwidth capability, as described with reference to FIGS. 1-3. in such cases, if the RAR 420-*a* is transmitted and received via a quantity of PRBs that is greater than a threshold quantity of PRBs supported by the network node 415-*a*, the network node 415-*a* may take more time to process the RAR 420-*a* than if the network node 415-*a* supports a full bandwidth capability. In such cases, the time period 425 may not account for the extended processing time, and the network node 415-*a* may not have sufficient time to process and respond to the RAR 420-*a* within the scheduled time period 425, which may reduce throughput and reliability and may increase latency of the random access procedure.

FIG. 4B illustrates a second random access timeline 400-*b*. In this example, the network node 415-*b* may support a reduced bandwidth capability, as described with reference to FIGS. 1-3, and the network node 405-*b* may determine a time period 435 that may be greater than or equal to the time period 425 described with reference to FIG. 4A to account for the reduced bandwidth capability of the network node 415-*b*. As described herein, to account for the reduced bandwidth capability of the network node 415-*b*, a duration of the time period 435 may be based on a quantity of PRBs via which the RAR 420-*b* is scheduled.

Although not illustrated in FIG. 4B, the network node 415-*b* may transmit first information that indicates the reduced bandwidth capability of the network node 415-*b*, a first random access message, or both to the network node 405-*b* at a time before the RAR 420-*b* is transmitted. The first information may be transmitted via one or more messages, which may include the first random access message or other types of uplink messages. The first random access message may be, for example, a random access preamble (e.g., Msg1), or some other type of random access message, and may represent an example of the first random access message 240 described with reference to FIG. 2. The network node 405-*b* may receive the first information, the first random access message, or both and may transmit an RAR 420-*b* (e.g., a Msg2 of a four-step random access procedure or a fallback RAR, as described with reference to FIG. 4A) in response. The RAR 420-*b* may schedule an uplink message 430-*b* (e.g., Msg3) and may indicate a time period 435 for transmission, by the network node 415-*b*, of the uplink message 430-*b* in response to the RAR 420-*b*.

In some aspects described herein, for baseband bandwidth reduction, some wireless communications systems may permit scheduling of an RAR 420 (e.g., an RAR PDSCH) to a device, such as the network node 415-*b*, that supports a reduced bandwidth capability (e.g., to an eRedCap UE or other type of device) via a quantity of PRBs that is greater than the threshold quantity of PRBs the device is capable of processing per slot (e.g., greater than the maximum quantity of unicast PRBs). In such cases, if the network node 415-*b* receives an RAR 420, such as the RAR 420-*b*, via a quantity of PRBs that is greater than the threshold quantity, the network node 415-*b* may transmit the uplink message 430-*b* if the time period 435 indicated via the RAR 420-*b* indicates that a time between reception of the RAR 420-*b* and transmission of the uplink message 430-*b* is not smaller than a threshold time period 440 supported by the reduced capability network node 415-*b*. As described herein, the threshold time period 440 supported by the reduced capability network node 415-*b* may be based on or equal to a sum of a first time duration and an extension time (e.g., $N_{T,1}$ + $N_{T,2}$ + 0.5 ms + X ms).

The first time duration may include a sum of a first processing time, $N_{T,1}$, an uplink preparation time, $N_{T,2}$, and a constant time duration (e.g., 0.5 ms, or some other constant value), as described with reference to FIG. 4A and Equation 1. The extension time as described herein may be based on a quantity of PRBs via which the RAR 420-*b* is scheduled. The network node 405-*b* may account for the threshold time period 440 based on receiving the first information that indicates the reduced capability of the network node 415-*b*. That is, the network node 405-*b* may determine the time period 435, T, to satisfy Equation 2, where X may represent the extension time in units of milliseconds, or some other unit of time.

$$T \geq N_{T,1} + N_{T,2} + 0.5 \text{ ms} + X \text{ ms} \tag{2}$$

The extension time in the threshold time period 440 associated with the reduced bandwidth capability may be based on a quantity of PRBs via which the RAR 420-*b* is scheduled. If the network node 415-*b* indicates that the network node 415-*b* supports a reduced bandwidth capability associated with a threshold quantity of PRBs, and the RAR 420-*b* is scheduled via a quantity of PRBs that is less than or equal to the threshold quantity of PRBs, the extension time may be zero (e.g., X=0). That is, the network node 415-*b* may be capable of processing the RAR 420-*b* in a single slot or hop without extending the first time duration (e.g., $T \geq N_{T,1}$ + $N_{T,2}$ + 0.5 ms may suffice).

If the network node 415-*b* indicates that the network node 415-*b* supports a reduced bandwidth capability associated with a threshold quantity of PRBs, and the RAR 420-*b* is scheduled via a quantity of PRBs that is greater than the threshold quantity of PRBs, the extension time may be greater than zero (e.g., X>0) to account for an increased processing time at the network node 415-*b* in accordance with the reduced bandwidth capability.

In some aspects, the duration of the extension time may be a constant value based on the quantity of PRBs via which the RAR 420-*b* is scheduled (e.g., PRB_num) being greater than the threshold quantity of PRBs (e.g., X may be 1 ms if the RAR 420-*b* is transmitted via more than the threshold quantity of PRBs, or some other constant duration). The constant duration may be defined or configured or indicated to the network node 415-*b*, the network node 405-*b*, or both via control signaling. In some other aspects, the duration of the extension time may be based on a difference between the quantity of PRBs via which the RAR 420-*b* is scheduled and the threshold quantity of PRBs. For example, the duration of the extension time may be proportional to the quantity of PRBs greater than the threshold quantity.

In some aspects, a system bandwidth may be divided into multiple ranges of PRB quantities, and each range of PRB quantities may be associated with or may correspond to a respective extension time. The duration of the extension time used to calculate or determine the threshold time period 440 may be based on the range of PRB quantities that includes the quantity of PRBs via which the RAR 420-*b* is scheduled. In some aspects, the ranges of PRB quantities may be defined by a respective maximum quantity of PRBs and a respective minimum quantity of PRBs, and each range may be associated with a respective extension time duration. One example of ranges of PRB quantities and corresponding extension times for a given SCS (e.g., 15 KHz SCS) is shown in Equation 3.

$$X = 0, \text{ if } PRB\_num \le 25 \qquad (3)$$

$$X = 0.5 \text{ ms, if } 25 < PRB\_num \le 52$$

$$X = 1 \text{ ms, if } 52 < PRB\_num \le 79$$

$$X = 1.5 \text{ ms, if } 79 < PRB\_num$$

In this example, the ranges of PRB quantities may include {[0,25], (25,52], (52,79], and (79,PRB_max]}, where PRB_max may represent a total quantity of PRBs (e.g., in the system bandwidth, the RF bandwidth, or some other bandwidth allocated for communications). In this example, if the RAR 420-*b* is scheduled via 53 PRBs (e.g., PRB_num=53), the extension time may be 1 ms, and the threshold time period 440 may be equal to $N_{T,1}+N_{T,2}+0.5$ ms+1 ms. Although four ranges are shown in Equation 3, it is to be understood that any quantity of ranges across any quantity of PRBs in a system bandwidth may be defined, and the extension time duration assigned to each range may vary based on one or more system parameters.

In some aspects, the ranges of PRB quantities may include a total quantity of PRBs (e.g., in the system bandwidth, the RF bandwidth, or some other bandwidth allocated for communications). Each range may include a same quantity of PRBs. The quantity of PRBs in each range may correspond to a fraction of the total quantity of PRBs. For example, the total quantity of PRBs may be divided into five equal ranges, or four equal ranges, or some other quantity of equal ranges of PRBs. Each equal range of PRB quantities may correspond to a respective extension time. One example of ranges of PRB quantities and corresponding extension times for a given SCS (e.g., 15 KHz SCS) and total PRB quantity (e.g., PRB_max=106) is shown in Equation 4.

$$X = 0, \text{ if } PRB\_num/PRB\_max \le 1/4 \qquad (4)$$

$$X = 0.5 \text{ ms, if } 1/4 < PRB\_num/PRB\_max \le 1/2$$

$$X = 1 \text{ ms, if } 1/2 < PRB\_num/PRB\_max \le 3/4$$

$$X = 1.5 \text{ ms, if } 3/4 < PRB\_num/PRB\_max$$

In this example, the ranges of PRB quantities may each include one fourth of the total quantity of PRBs, where PRB_max may represent the total quantity of PRBs and PRB_num may represent the quantity of PRBs via which the RAR 420-*b* is scheduled. In this example, if the RAR 420-*b* is scheduled via 53 PRBs (e.g., PRB_num=53) and the total quantity of PRBs is 106 PRBs (e.g., PRB_max=106), the extension time may be 0.5 ms because PRB_num/PRB_max may equal 0.5, and the threshold time period 440 may be equal to $N_{T,1}+N_{T,2}+0.5$ ms+0.5 ms. Although four ranges are shown in Equation 4, it is to be understood that any quantity of ranges across any quantity of PRBs in a system bandwidth may be defined, and the extension time duration assigned to each range may vary based on one or more system parameters.

The extension time may thereby be based on a quantity of PRBs associated with the RAR 420-*b*. The extension time may be defined as a constant or defined per range of PRB quantities, or both via a configuration (e.g., during manufacture of a device or defined in a standard), or via signaling exchanged between the network node 405-*b* and the network node 415-*b*. The network node 405-*b* may determine (e.g., calculate), prior to transmitting the RAR 420-*b*, the threshold time period 440 corresponding to the reduced bandwidth capability of the network node 415-*b* based on the quantity of PRBs scheduled or allocated for the transmission of the RAR 420-*b*. The network node 405-*b* may determine the time period 435 based on the threshold time period 440 and one or more other communication parameters. For example, the network node 405-*b* may determine the time period 435 to be greater than or equal to the threshold time period 440 to support reliable communications with the reduced capability network node 415-*b*. The network node 405-*b* may transmit the RAR 420-*b* including an indication of the time period 435 to the network node 415-*b*.

The network node 415-*b* may, in some aspects, verify that the time period 435 is greater than or equal to the threshold time period 440. For example, the network node 415-*b* may determine the threshold time period 440 based on the defined or indicated rules and the quantity of PRBs via which the RAR 420-*b* is received. The network node 415-*b* may compare the time period 435 indicated via the RAR 420-*b* with the threshold time period 440. The network node 415-*b* may determine whether the indicated time period 435 is greater than or equal to the threshold time period 440. If the network node 415-*b* determines that the indicated time period 435 is less than the threshold time period 440, the network node 415-*b* may refrain from transmitting the uplink message 430-*b*. If the network node 415-*b* determines that the indicated time period 435 is greater than or equal to the threshold time period 440, the network node 415-*b* may process the RAR 420-*b* and prepare the uplink message 430-*b* during the time period 435, and the network node 415-*b* may transmit the uplink message 430-*b* within a time window that is based on the indicated time period 435 (e.g., at a second time that is offset from a first time at which the RAR 420-*b* is received by the time period 435).

It is to be understood that the terms "threshold time period," "first time duration," and "extension time," as used herein, are interchangeable and provide examples. For example, the threshold time period 440 and the time period 435 may additionally, or alternatively, be referred to as time durations, or some other term representative of time. The threshold time period 440, the first time duration, the time period 435, and the extension time described herein represent examples of different units of time that may be used to accommodate for processing, by a reduced capability device, of a relatively large quantity of PRBs.

The techniques described herein may thereby define an extended random access timeline to provide for a reduced capability network node to receive a random access message, such as an RAR 420, via a quantity of PRBs that is greater than a threshold quantity supported by the reduced capability network node. By extending the timeline, the reduced capability network node may process the RAR 420 received via an increased bandwidth and prepare an uplink message 430 for transmission in response to the RAR 420, which may improve throughput and reduce latency as compared with systems in which the timeline may not be extended. The random access timeline extensions described herein may be applicable to multiple different types of random access messages and procedures, as described in further detail elsewhere herein, including with reference to FIGS. 5-7.

Figure 5:
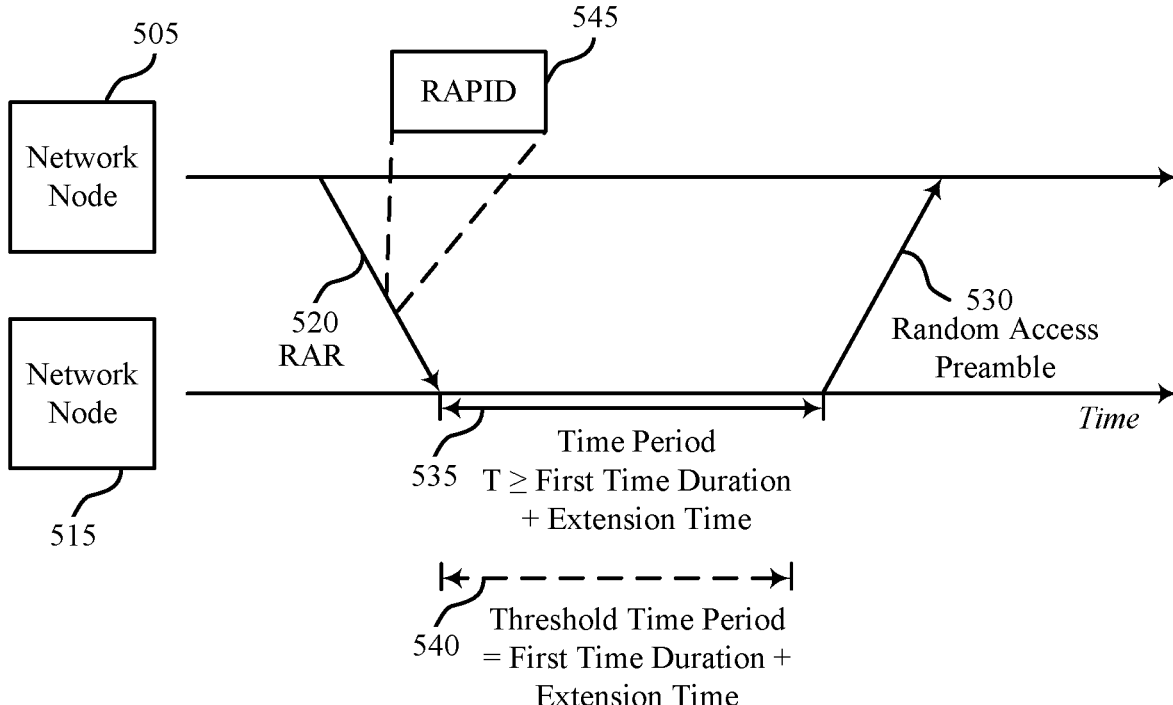
FIG. 5 illustrates an example of a random access timeline that supports a random access timeline for a reduced capability device in accordance with one or more aspects of the present disclosure.

FIG. 5 illustrates an example of a random access timeline 500 that supports a random access timeline for a reduced capability device in accordance with one or more aspects of the present disclosure. The random access timeline 500 may implement or be implemented by aspects of the wireless communications systems 100 and 200. For example, the random access timeline 500 illustrates a timeline for transmission, by a network node 505, of an RAR 520 including a RAPID 545, reception and processing of the RAR 520 by a network node 515, and transmission, by the network node 515, of a random access preamble 530 in response to the RAR 520. The network node 505 and the network node 515 may represent examples of corresponding devices as described with reference to FIGS. 1-4. In some aspects, a time period 535 between reception, by the network node 515, of the RAR 520 and transmission, by the network node 515, of the random access preamble 530 may be based on a bandwidth capability of the network node 515, a quantity of PRBs via which the RAR 520 is scheduled, or both.

Although not illustrated in FIG. 5, the network node 515 may transmit first information that indicates the reduced bandwidth capability of the network node 515, a first random access message, or both to the network node 505 at a time before the RAR 520 is transmitted. The first information may be transmitted via one or more messages, which may include the first random access message or other types of uplink messages. The first random access message may be, for example, a random access preamble (e.g., Msg1), or some other type of random access message, and may represent an example of the first random access message 240 described with reference to FIG. 2. The network node 505 may receive the first information, the first random access message, or both and may transmit an RAR 520 (e.g., Msg2 or MsgB) in response. The RAR 520 may be referred to as a second random access message in some aspects herein. The RAR 520 may include an RAPID 545 that identifies a random access preamble to which the RAR 520 is responsive.

In some aspects, the network node 505 may transmit an RAR 520 with an incorrect RAPID 545 to the network node 515. For example, the RAPID 545 indicated via the RAR 520 may be different than or not correctly associated with a random access preamble previously transmitted by the network node 515. In such cases, the RAR 520 may be intended for a different network node, or may be transmitted in error. If the network node 515 receives an RAR 520 that includes an incorrect RAPID 545, the network node 515 may respond by retransmitting the random access preamble 530. The random access preamble 530 may thereby be a repetition of or second transmission of a previously transmitted random access preamble.

The RAR 520 may indicate a time period 535 for transmission, by the network node 515, of a retransmission of a random access preamble 530 in response to the RAR 520 if the RAR 520 includes an incorrect RAPID 545. In some aspects, the RAR 520 may indicate a single time period 535 that may be applicable to transmission of an uplink message in response to the RAR 520 (e.g., as described with reference to FIGS. 4A and 4B) if the RAPID 545 in the RAR 520 is correct, or may be applicable to a retransmission of a random access preamble 530 in response to the RAR 520 if the RAPID 545 conveyed via the RAR 520 is incorrect (e.g., a same time period 535 for both scenarios). In such cases, the time period 535 may be defined the same as the time period 435 described with reference to FIG. 4B. Additionally, or alternatively, the RAR 520 may indicate the time period 535 for retransmission of the random access preamble 530 and may separately indicate a time period for transmission of an uplink message.

As described herein, the RAR 520 may be transmitted, to the network node 515, via a quantity of PRBs that is greater than a threshold quantity of PRBs associated with a bandwidth capability of the network node 515. Techniques, systems, and devices described herein provide for the time period 535 to account for additional processing by the network node 515 due to the increased bandwidth of the RAR 520. As described in further detail with reference to FIG. 4B, a threshold time period 540 may be defined and may correspond to the reduced bandwidth capability of the network node 515. The threshold time period 540 may be different for different quantities of PRBs and may indicate a minimum time period for the network node 515 to receive and process the RAR 520 via the corresponding quantity of PRBs. The threshold time period 540 may be equal to a sum of a first time duration and an extension time, Y. In this example, the first time duration may include a sum of a first processing time, $N_{T,1}$, for the network node 515 and a constant time duration (e.g., 0.75 ms, or some other constant value), such that the threshold time period 540 may be defined as $T=N_{T,1}+0.75$ ms+Y ms.

The extension time, Y, may be based on the quantity of PRBs via which the RAR 520 is conveyed. The extension time, Y, may account for the reduced bandwidth capability of the network node 515, similar to the extension time, X, described with reference to FIG. 4B. If the RAR 520 is scheduled via a quantity of PRBs that is less than or equal to the threshold quantity of PRBs supported by the network node 515, the extension time may be zero (e.g., Y=0). That is, the network node 515 may be capable of processing the RAR 520 in a single slot or hop without extending the first duration allocated for processing (e.g., $N_{T,1}+0.75$ ms). If the RAR 520 is scheduled via a quantity of PRBs that is greater than the threshold quantity of PRBs, the extension time may be greater than zero (e.g., Y>0) to account for an increased processing time at the network node 515 in accordance with the reduced bandwidth capability.

As described in further detail elsewhere herein, including with reference to FIG. 4B, the extension time may be defined as a constant value (e.g., 1 ms or some other time period) if the quantity of PRBs exceeds the threshold quantity, or the extension time may be based on a difference between the quantity of PRBs and the threshold quantity, or the extension time may be based on a range of PRB quantities that includes the quantity of PRBs. For example, a bandwidth allocated for communications may be divided into multiple ranges of PRB quantities, and each range of PRB quantities may be associated with or may correspond to a respective extension time. The duration of the extension time used for determining the threshold time period 540 may be based on the range of PRB quantities that includes the quantity of PRBs via which the RAR 520 is scheduled.

The extension time, Y, used for timing between reception of the RAR 520 and retransmission of the random access preamble 530, may be the same as the extension time, X, used for timing between RAR reception and uplink message transmission, as described with reference to FIG. 4B. Additionally, or alternatively, the extension time, Y, may be defined differently than the extension time, X, used for the timing between RAR reception and uplink message transmission. One or more rules or procedures for defining the extension time, in the context of timing between RAR reception and random access preamble retransmission, as a constant or per range of PRB quantities, or both may be configured (e.g., during manufacture of a device or defined in a standard), or indicated via signaling exchanged between the network node 505 and the network node 515.

The network node 505 may determine (e.g., calculate), prior to transmitting the RAR 520, the threshold time period 540 corresponding to the reduced bandwidth capability of the network node 515 based on the quantity of PRBs scheduled or allocated for the transmission of the RAR 520. The network node 505 may determine the time period 535 based on the threshold time period 540 and one or more other communication parameters. For example, the network node 505 may determine the time period 535 to be greater than or equal to the threshold time period 540 to support reliable communications with the reduced capability network node 515. The network node 505 may transmit the RAR 520 including an indication of the time period 535 to the network node 515. The network node 515 may, in some aspects, verify that the time period 535 is greater than or equal to the threshold time period 540 to determine whether to retransmit the random access preamble 530 at the scheduled time, as described with reference to FIG. 4B.

The described timeline extension techniques for random access procedures may thereby be applied to a time period between reception of an RAR 520 including an incorrect or invalid RAPID 545 and retransmission of a responsive random access preamble 530. The network node 505 may thereby support an increased bandwidth for the RAR 520 while maintaining reliable communications with the reduced capability network node 515.

Figure 6:
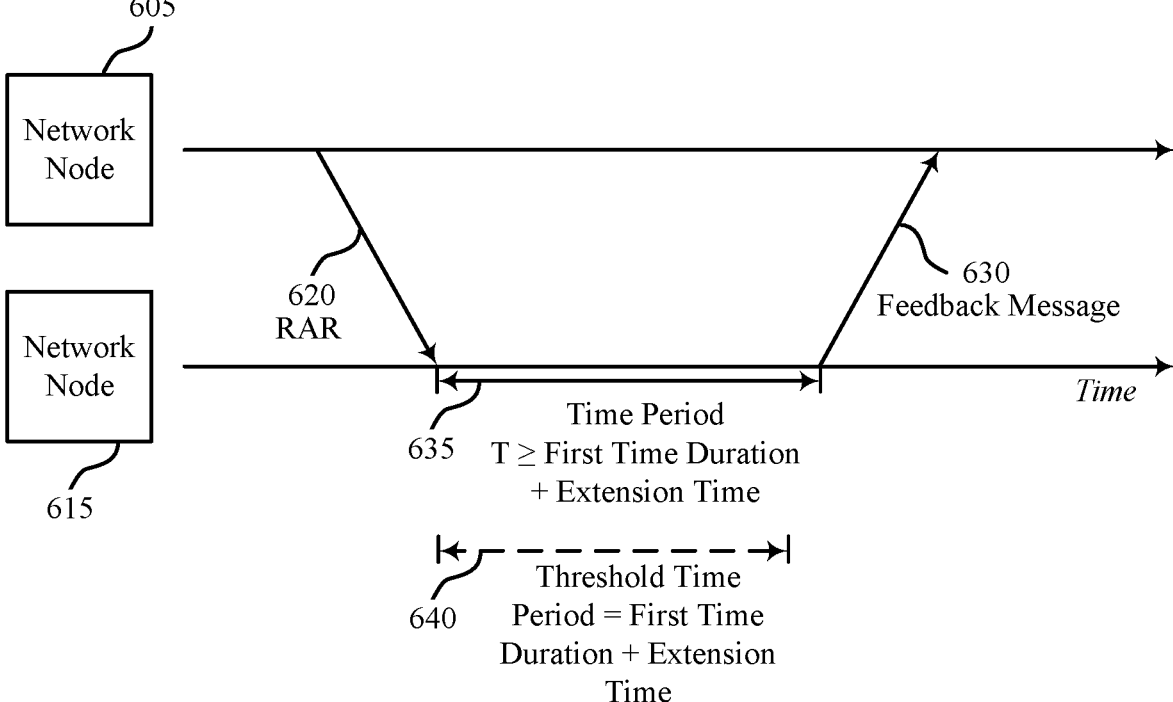
FIG. 6 illustrates an example of a random access timeline that supports a random access timeline for a reduced capability device in accordance with one or more aspects of the present disclosure.

FIG. 6 illustrates an example of a random access timeline 600 that supports a random access timeline for a reduced capability device in accordance with one or more aspects of the present disclosure. The random access timeline 600 may implement or be implemented by aspects of the wireless communications systems 100 and 200. For example, the random access timeline 600 illustrates a timeline for transmission, by a network node 605, of an RAR 620, reception and processing of the RAR 620 by a network node 615, and transmission, by the network node 615, of a feedback message 630 in response to the RAR 620. The network node 605 and the network node 615 may represent examples of corresponding devices as described with reference to FIGS. 1-5. In some aspects, a time period 635 between reception, by the network node 615, of the RAR 620 and transmission, by the network node 615, of the feedback message 630 may be based on a bandwidth capability of the network node 615, a quantity of PRBs via which the RAR 620 is scheduled, or both.

Although not illustrated in FIG. 6, the network node 615 may transmit first information that indicates the reduced bandwidth capability of the network node 615, a first random access message, or both to the network node 605 at a time before the RAR 620 is transmitted. The first information may be transmitted via one or more messages, which may include the first random access message or other types of uplink messages. The first random access message may be, for example, a random access preamble (e.g., Msg1), or some other type of random access message, and may represent an example of the first random access message 240 described with reference to FIG. 2.

The network node 605 may receive the first information, the first random access message, or both and may transmit an RAR 620 (e.g., Msg2 or MsgB) in response. The RAR 620 may be referred to as a second random access message in some aspects herein. The RAR 620 may indicate a success of a random access procedure (e.g., a successRAR in a two-step random access procedure) based on the first random access message. The RAR 620 may indicate a time period 635 for transmission, by the network node 615, of a feedback message 630 (e.g., HARQ feedback) in response to the RAR 620.

As described herein, the RAR 620 may be transmitted, to the network node 615, via a quantity of PRBs that is greater than a threshold quantity of PRBs associated with a bandwidth capability of the network node 615. Techniques, systems, and devices described herein provide for the time period 635 to account for additional processing by the network node 615 due to the increased bandwidth of the RAR 620. As described in further detail with reference to FIG. 4B, a threshold time period 640 may be defined and may correspond to the reduced bandwidth capability of the network node 615. The threshold time period 640 may be different for different quantities of PRBs via which the RAR 620 is conveyed and may indicate a minimum time period for the network node 615 to receive and process the RAR 620 via the corresponding quantity of PRBs. The threshold time period 640 may be equal to a sum of a first time duration and an extension time, Z. In this example, the first time duration may include a sum of a first processing time, $N_{T,1}$, for the network node 615 and a constant time duration (e.g., 0.5 ms, or some other constant value), such that the threshold time period 640 may be defined as $T=N_{T,1}+0.5$ ms+Z ms.

The extension time, Z, may be based on the quantity of PRBs via which the RAR 620 is conveyed. The extension time, Z, may account for the reduced bandwidth capability of the network node 615, similar to the extension times, X and Y, described with reference to FIGS. 4B and 5. If the RAR 620 is scheduled via a quantity of PRBs that is less than or equal to the threshold quantity of PRBs supported by the network node 615, the extension time may be zero (e.g., Z=0). That is, the network node 615 may be capable of processing the RAR 620 in a single slot or hop without extending the first duration allocated for processing (e.g., $N_{T,1}+0.5$ ms). If the RAR 620 is scheduled via a quantity of PRBs that is greater than the threshold quantity of PRBs, the extension time may be greater than zero (e.g., Z>0) to account for an increased processing time at the network node 615 in accordance with the reduced bandwidth capability.

As described in further detail elsewhere herein, including with reference to FIG. 4B, the extension time may be defined as a constant value (e.g., 1 ms or some other time period) if the quantity of PRBs exceeds the threshold quantity, or the extension time may be based on a difference between the quantity of PRBs and the threshold quantity, or the extension time may be based on a range of PRB quantities that includes the quantity of PRBs. For example, a bandwidth allocated for wireless communications may be divided into multiple ranges of PRB quantities, and each range of PRB quantities may be associated with or may correspond to a respective extension time. The duration of the extension time used for determining the threshold time period 640 may be based on the range of PRB quantities that includes the quantity of PRBs via which the RAR 620 is scheduled.

The extension time, Z, used for timing between reception of the RAR 620 and transmission of the feedback message 630, may be the same as the extension time, X, used for timing between RAR reception and uplink message transmission, as described with reference to FIG. 4B or the extension time, Y, used for timing between RAR reception and random access preamble retransmission, as described with reference to FIG. 5, or both. Additionally, or alternatively, the extension time, Z, may be defined differently than the extension times X and Y described with reference to FIGS. 4B and 5. One or more rules or procedures for defining, in the context of feedback transmission after RAR reception, the extension time as a constant or per range of PRB quantities, or both may be configured (e.g., during manufacture of a device or defined in a standard), or indicated via signaling exchanged between the network node 605 and the network node 615.

The network node 605 may determine (e.g., calculate), prior to transmitting the RAR 620, the threshold time period 640 corresponding to the reduced bandwidth capability of the network node 615 based on the quantity of PRBs scheduled or allocated for the transmission of the RAR 620 and the one or more configured rules or procedures. The network node 605 may determine the time period 635 based on the threshold time period 640 and one or more other communication parameters. For example, the network node 605 may determine the time period 635 to be greater than or equal to the threshold time period 640 to support reliable communications with the reduced capability network node 615 (e.g., $T \geq N_{T,1} + 0.5$ ms+Z ms). The network node 605 may transmit the RAR 620 including an indication of the time period 635 to the network node 615. The network node 615 may, in some aspects, verify that the time period 635 is greater than or equal to the threshold time period 640 to determine whether to transmit the feedback message 630 at the scheduled time, as described with reference to FIG. 4B.

The described timeline extension techniques for random access procedures may thereby be applied to a time period between reception of an RAR 620 indicating a success of a random access procedure and transmission of a responsive feedback message 630. The network node 605 may thereby support an increased bandwidth for the RAR 620 while maintaining reliable communications with the reduced capability network node 615.

Figure 7:
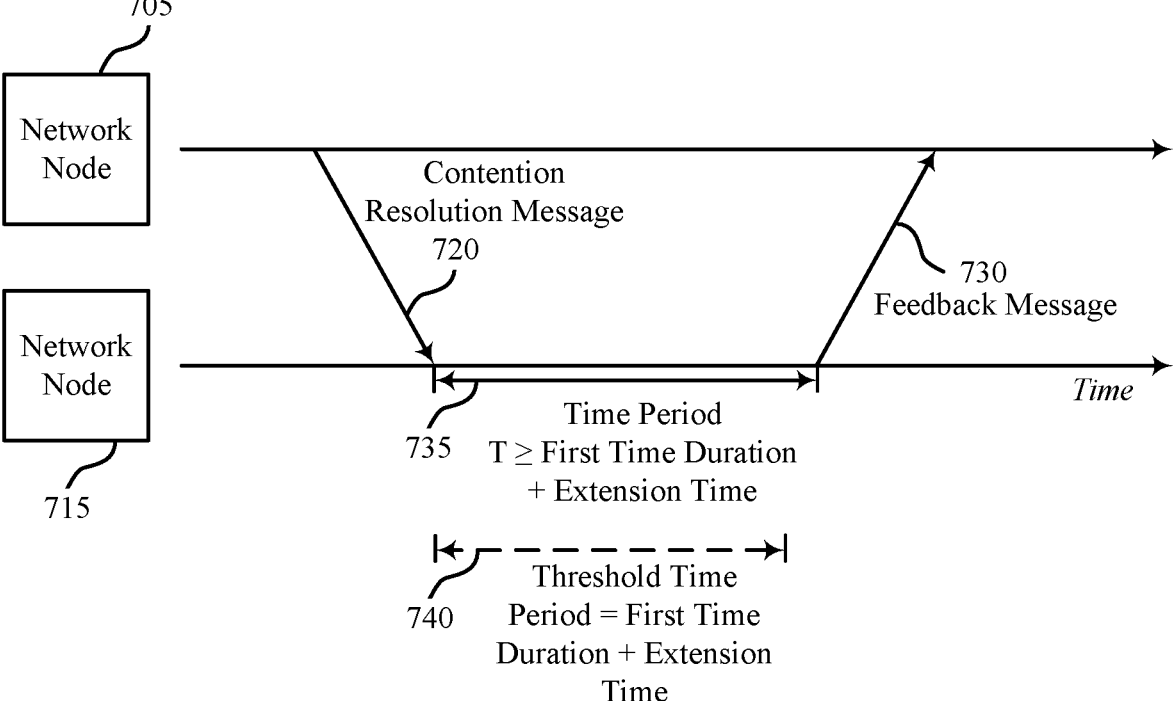
FIG. 7 illustrates an example of a random access timeline that supports a random access timeline for a reduced capability device in accordance with one or more aspects of the present disclosure.

FIG. 7 illustrates an example of a random access timeline 700 that supports a random access timeline for a reduced capability device in accordance with one or more aspects of the present disclosure. The random access timeline 700 may implement or be implemented by aspects of the wireless communications systems 100 and 200. For example, the random access timeline 700 illustrates a timeline for transmission, by a network node 705, of a contention resolution message 720, reception and processing of the contention resolution message 720 by a network node 715, and transmission, by the network node 715, of a feedback message 730 in response to the contention resolution message 720. The network node 705 and the network node 715 may represent examples of corresponding devices as described with reference to FIGS. 1-6. In some aspects, a time period 735 between reception, by the network node 715, of the contention resolution message 720 and transmission, by the network node 715, of the feedback message 730 may be based on a bandwidth capability of the network node 715, a quantity of PRBs via which the contention resolution message 720 is scheduled, or both.

Although not illustrated in FIG. 7, the network node 715 may transmit first information that indicates the reduced bandwidth capability of the network node 715, a first random access message, or both to the network node 705 at a time before the contention resolution message 720 is transmitted. The first information may be transmitted via one or more messages, which may include the first random access message or other types of uplink messages. The first random access message may be, for example, an uplink scheduled transmission (e.g., Msg3 in a four-step random access procedure), or some other type of random access message, and may represent an example of the first random access message 240 described with reference to FIG. 2.

The network node 705 may receive the first information, the first random access message, or both and may transmit a downlink contention resolution message 720 (e.g., Msg2 or MsgB) in response. The contention resolution message 720 may be referred to as a second random access message in some aspects herein. The contention resolution message 720 may indicate a time period 735 for transmission, by the network node 715, of a feedback message 730 (e.g., HARQ feedback) in response to the contention resolution message 720.

As described herein, the contention resolution message 720 may be transmitted, to the network node 715, via a quantity of PRBs that is greater than a threshold quantity of PRBs associated with a bandwidth capability of the network node 715. Techniques, systems, and devices described herein provide for the time period 735 to account for additional processing by the network node 715 due to the increased bandwidth of the contention resolution message 720. As described in further detail with reference to FIG. 4B, a threshold time period 740 may be defined and may correspond to the reduced bandwidth capability of the network node 715. The threshold time period 740 may be different for different quantities of PRBs via which the contention resolution message 720 is conveyed and may indicate a minimum time period for the network node 715 to receive and process the contention resolution message 720 via the corresponding quantity of PRBs. The threshold time period 740 may be equal to a sum of a first time duration and an extension time, W. In this example, the first time duration may include a sum of a first processing time, $N_{T,1}$, for the network node 715 and a constant time duration (e.g., 0.5 ms, or some other constant value), such that the threshold time period 740 may be defined as $T = N_{T,1} + 0.5$ ms+W ms.

The extension time, W, may be based on the quantity of PRBs via which the contention resolution message 720 is conveyed. The extension time, W, may account for the reduced bandwidth capability of the network node 715, similar to the extension times, X, Y, and Z, described with reference to FIGS. 4B-6. If the contention resolution message 720 is scheduled via a quantity of PRBs that is less than or equal to the threshold quantity of PRBs supported by the network node 715, the extension time may be zero (e.g., W=0). That is, the network node 715 may be capable of processing the contention resolution message 720 in a single slot or hop without extending the first duration allocated for processing (e.g., $N_{T,1} + 0.5$ ms). If the contention resolution message 720 is scheduled via a quantity of PRBs that is greater than the threshold quantity of PRBs, the extension time may be greater than zero (e.g., W>0)) to account for an increased processing time at the network node 715 in accordance with the reduced bandwidth capability.

As described in further detail elsewhere herein, including with reference to FIG. 4B, the extension time may be defined as a constant value (e.g., 1 ms or some other time period) if the quantity of PRBs exceeds the threshold quantity, or the extension time may be based on a difference between the quantity of PRBs and the threshold quantity, or the extension time may be based on a range of PRB quantities that includes the quantity of PRBs. For example, a bandwidth allocated for wireless communications may be divided into multiple ranges of PRB quantities, and each range of PRB quantities may be associated with or may correspond to a respective extension time. The duration of the extension time used for determining the threshold time period 740 may be based on the range of PRB quantities that includes the quantity of PRBs via which the contention resolution message 720 is scheduled.

The extension time, W, used for timing between reception of the contention resolution message 720 and transmission of the feedback message 730, may be the same as the extension time, X, used for timing between RAR reception and uplink message transmission, as described with reference to FIG. 4B, or the extension time, Y, used for timing between RAR reception and random access preamble retransmission, as described with reference to FIG. 5, or the extension time, Z, used for timing between RAR reception and feedback transmission, as described with reference to FIG. 6, or any combination thereof. Additionally, or alternatively, the extension time, W, may be defined differently than the extension times X, Y, and Z described with reference to FIGS. 4B-6. One or more rules or procedures for defining, in the context of feedback transmission after contention resolution message reception, the extension time as a constant or per range of PRB quantities, or both may be configured (e.g., during manufacture of a device or defined in a standard), or indicated via signaling exchanged between the network node 705 and the network node 715.

The network node 705 may determine (e.g., calculate), prior to transmitting the contention resolution message 720, the threshold time period 740 corresponding to the reduced bandwidth capability of the network node 715 based on the quantity of PRBs scheduled or allocated for the transmission of the contention resolution message 720 and the one or more configured rules or procedures. The network node 705 may determine the time period 735 based on the threshold time period 740 and one or more other communication parameters. For example, the network node 705 may determine the time period 735 to be greater than or equal to the threshold time period 740 to support reliable communications with the reduced capability network node 715 (e.g., $T \geq N_{T,1} + 0.5$ ms+W ms). The network node 705 may transmit the contention resolution message 720 including an indication of the time period 735 to the network node 715. The network node 715 may, in some aspects, verify that the time period 735 is greater than or equal to the threshold time period 740 to determine whether to transmit the feedback message 730 at the scheduled time, as described with reference to FIG. 4B.

The described timeline extension techniques for random access procedures may thereby be applied to a time period between reception of a contention resolution message 720 and transmission of a responsive feedback message 730. The network node 705 may thereby support an increased bandwidth for the contention resolution message 720 while maintaining reliable communications with the reduced capability network node 715.

Figure 8:
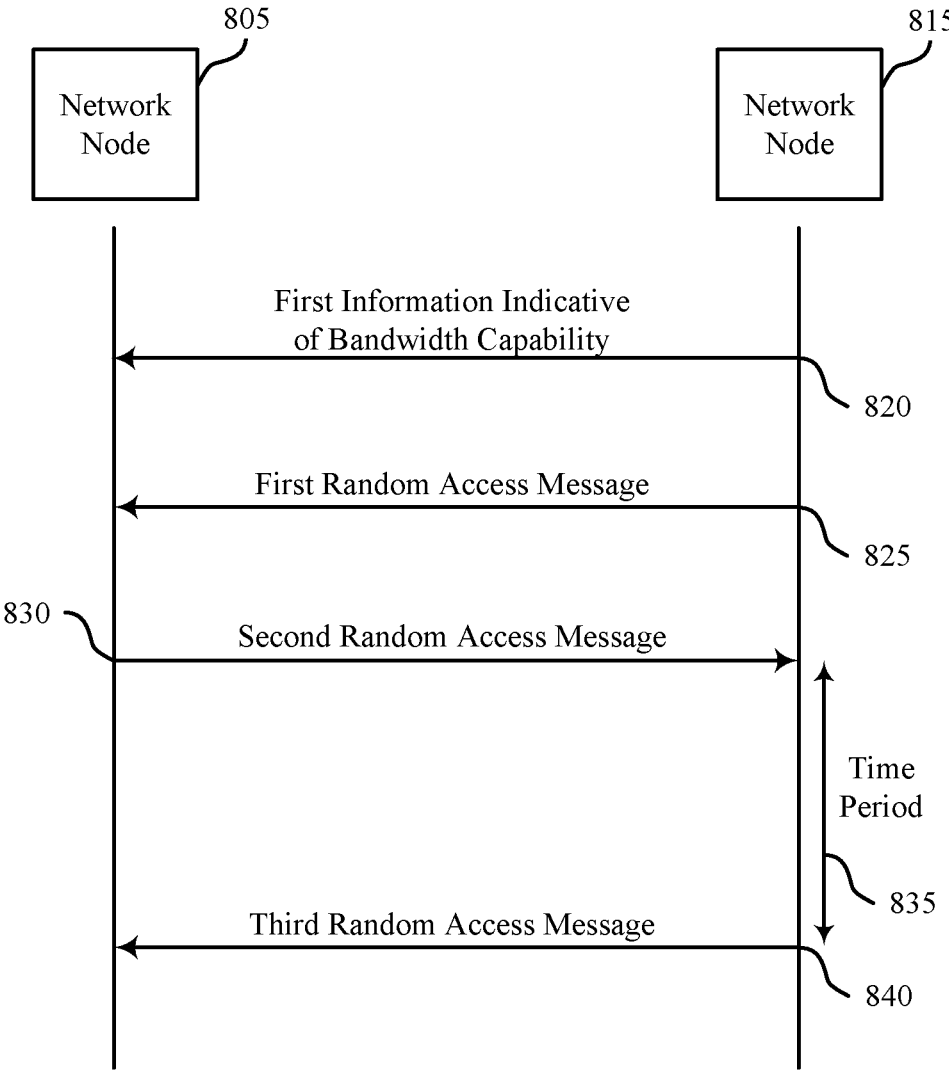
FIG. 8 illustrates an example of a process flow that supports a random access timeline for a reduced capability device in accordance with one or more aspects of the present disclosure.

FIG. 8 illustrates an example of a process flow 800 that supports a random access timeline for a reduced capability device in accordance with one or more aspects of the present disclosure. The process flow 800 may implement or be implemented by aspects of the wireless communications systems 100 and 200 or the random access timelines 400, 500, 600, and 700. For example, the process flow 800 illustrates communications between a network node 805 and a network node 815, which may represent aspects of corresponding devices as described with reference to FIGS. 1-7. In some aspects, the network node 815 may support a reduced bandwidth capability associated with a threshold bandwidth for per slot processing. The network node 805 may account for the reduced bandwidth capability when scheduling random access messages, which may provide for improved coordination between the devices.

In the following description of the process flow 800, the operations between the network node 805 and the network node 815 may be performed in different orders or at different times. Some operations may also be left out of the process flow 800, or other operations may be added. Although the network node 805 and the network node 815 are shown performing the operations of the process flow 800, some aspects of some operations may also be performed by one or more other wireless devices.

At 820, the network node 815 may transmit, to the network node 805, first information indicative of a bandwidth capability of the network node 815. The first information may be conveyed via a random access message, or some other type of uplink message. The first information may indicate that the network node 815 is a reduced capability network node 815 and supports a reduced bandwidth capability. In some aspects, the network node 805 may determine that the reduced bandwidth capability is associated with a threshold quantity of PRBs that the network node 815 is capable of processing per slot based on one or more rules or configured parameters. Additionally, or alternatively, the first information may indicate the threshold quantity of PRBs.

At 825, the network node 815 may transmit a first random access message to the network node 805. The first random access message may represent an example of the first random access message 240 described with reference to FIG. 2. In some aspects, the first random access message may convey the first information (e.g., the network node 815 may transmit a single transmission that includes the first random access message and the first information). The first random access message may be, for example, a random access preamble (e.g., MsgA or Msg1), an uplink transmission (e.g., Msg3), or some other type of random access message.

At 830, the network node 805 may transmit a second random access message to the network node 815 based on or in response to the first random access message. The network node 805 may schedule the transmission of the second random access message via a quantity of PRBs (e.g., any quantity of PRBs from within a system bandwidth allocated for wireless communications). The second random access message may indicate a time period 835 for transmission, by the network node 815, of a third random access message responsive to the second random access message. The time period 835 may represent an example of the time periods 435, 535, 635, and 735 described with reference to FIGS. 4-7 and may be based on a threshold time period (e.g., the threshold time periods 440, 540, 640, and 740, described with reference to FIGS. 4-7) associated with the bandwidth capability of the network node 815.

The threshold time period may be based on the quantity of PRBs via which the second random access message is received. For example, the threshold time period may be based on (e.g., equal to) a first duration of time and an extension time, where the first duration of time is based on a processing time associated with the second random access message and the extension time is based on the quantity of PRBs, as described in further detail elsewhere herein, including with reference to FIGS. 4-7. In some aspects, before transmitting the second random access message, the network node 805 may determine the threshold time period associated with the bandwidth capability of the network node 815, and the network node 805 may determine or select the time period 835 to be greater than or equal to the threshold time period. The second random access message may represent an example of the second random access message 245, the RAR 420, the RAR 520, the RAR 620, or the contention resolution message 720, as described with reference to FIGS. 2 and 4-7.

At 840, the network node 815 may transmit the third random access message based on the time period 835. The network node 805 may monitor for the third random access message based on the time period 835. For example, the network node 815 may transmit the third random access message during a time window that is based on or centered around a time at which the time period 835 expires. Additionally, or alternatively, the network node 815 may transmit the third random access message at a second time that is offset from receipt of the second random access message by the time period 835. The third random access message may be, for example, an uplink transmission scheduled by the second random access message (e.g., a Msg3), a retransmission of a random access preamble (e.g., a Msg1 or MsgA), or a feedback message.

In some aspects, the network node 815 may determine, based on receipt of the second random access message including the time period 835, whether the time period 835 is greater than or equal to the threshold time period associated with the bandwidth capability of the network node 815. The network node 815 may refrain from transmitting the third random access message at the scheduled time if the network node 815 determines that the time period 835 indicated via the second random access message is less than the threshold time period. In such cases, the network node 815 may indicate a failure of the random access procedure, or the network node 815 may transmit the third random access message at some delayed time, or the network node 815 may restart the random access procedure (e.g., by retransmitting a previously transmitted random access message, such as the first random access message). The network node 815 may transmit the third random access message at the scheduled time if the network node 815 determines that the time period 835 indicated via the second random access message is greater than or equal to the threshold time period.

The described random access timeline may thereby provide for a reduced capability network node 815 to receive a random access message via a quantity of PRBs that is greater than a threshold quantity of PRBs that the network node 815 is capable of processing per slot. By indicating the reduced bandwidth capability, the network node 815 may inform the network node 805 of the threshold quantity of PRBs, such that the network node 805 may indicate a time period that is sufficiently long, based on the quantity of PRBs via which the random access message is transmitted, to support an increased processing time by the network node 815.

Figure 9:
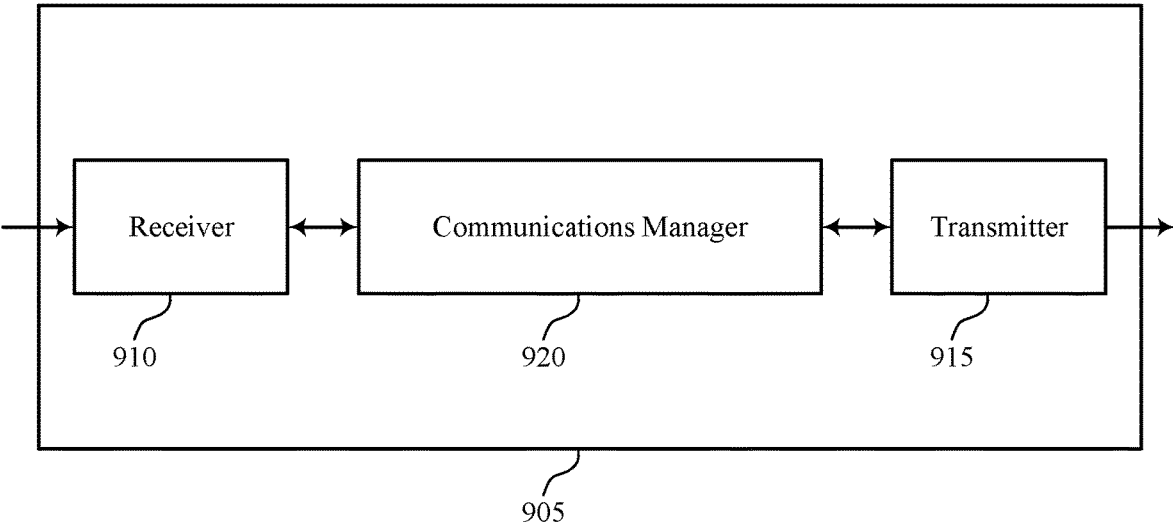
FIGS. 9 and 10 illustrate block diagrams of devices that support a random access timeline for a reduced capability device in accordance with one or more aspects of the present disclosure.

FIG. 9 illustrates a block diagram 900 of a device 905 that supports a random access timeline for a reduced capability device in accordance with one or more aspects of the present disclosure. The device 905 may be an example of aspects of a UE 115 or a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to a random access timeline for a reduced capability device). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to a random access timeline for a reduced capability device). In some aspects, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of a random access timeline for a reduced capability device as described herein. For example, the communications manager 920, the receiver 910, the transmitter 915, or various combinations or components thereof may support a method for performing one or more of the functions described herein.

In some aspects, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some aspects, a processor and memory coupled with the processor may be configured to perform one or more of the functions described herein (e.g., by executing, by the processor, instructions stored in the memory).

Additionally, or alternatively, in some aspects, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some aspects, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication at a first network node in accordance with examples as disclosed herein. For example, the communications manager 920 may be configured as or otherwise support a means for receiving first information that is indicative of a bandwidth capability of a second network node. The communications manager 920 may be configured as or otherwise support a means for receiving a first random access message. The communications manager 920 may be configured as or otherwise support a means for transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

Additionally, or alternatively, the communications manager 920 may support wireless communication at a first network node in accordance with examples as disclosed herein. For example, the communications manager 920 may be configured as or otherwise support a means for transmitting first information that is indicative of a bandwidth capability of the first network node. The communications manager 920 may be configured as or otherwise support a means for transmitting a first random access message. The communications manager 920 may be configured as or otherwise support a means for receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs. The communications manager 920 may be configured as or otherwise support a means for transmitting the third random access message during a time window that is based on the time period.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for reduced processing, reduced power consumption, and more efficient utilization of communication resources.

Figure 10:
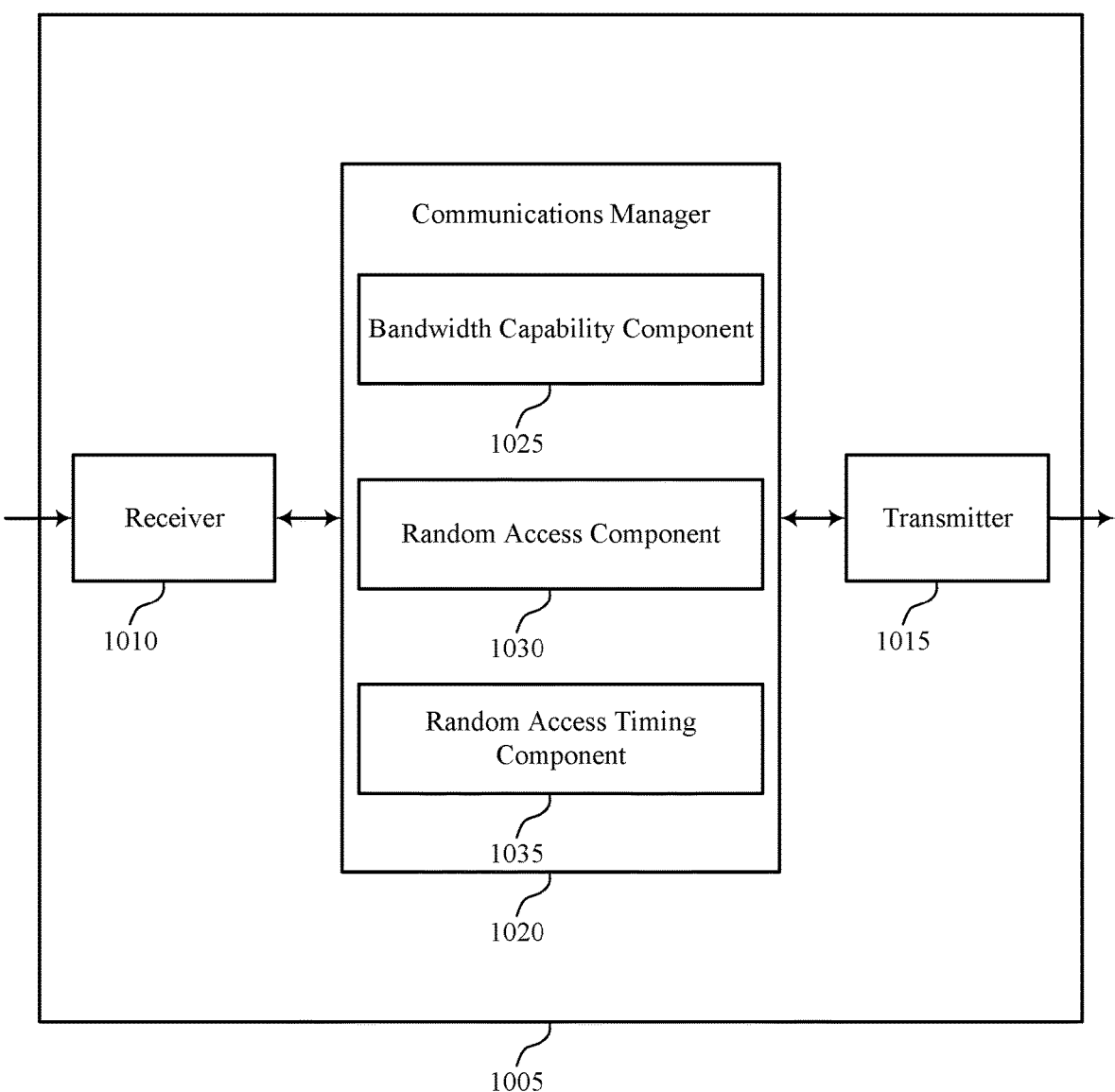

FIG. 10 illustrates a block diagram 1000 of a device 1005 that supports a random access timeline for a reduced capability device in accordance with one or more aspects of the present disclosure. The device 1005 may be an example of aspects of a device 905, a UE 115, or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to a random access timeline for a reduced capability device). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to a random access timeline for a reduced capability device). In some aspects, the transmitter 1015 may be co-located with a receiver 1010 in a transceiver module. The transmitter 1015 may utilize a single antenna or a set of multiple antennas.

The device 1005, or various components thereof, may be an example of means for performing various aspects of a random access timeline for a reduced capability device as described herein. For example, the communications manager 1020 may include a bandwidth capability component 1025, a random access component 1030, a random access timing component 1035, or any combination thereof. The communications manager 1020 may be an example of aspects of a communications manager 920 as described herein. In some aspects, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first network node in accordance with examples as disclosed herein. The bandwidth capability component 1025 may be configured as or otherwise support a means for receiving first information that is indicative of a bandwidth capability of a second network node. The random access component 1030 may be configured as or otherwise support a means for receiving a first random access message. The random access timing component 1035 may be configured as or otherwise support a means for transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

Additionally, or alternatively, the communications manager 1020 may support wireless communication at a first network node in accordance with examples as disclosed herein. The bandwidth capability component 1025 may be configured as or otherwise support a means for transmitting first information that is indicative of a bandwidth capability of the first network node. The random access component 1030 may be configured as or otherwise support a means for transmitting a first random access message. The random access timing component 1035 may be configured as or otherwise support a means for receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs. The random access component 1030 may be configured as or otherwise support a means for transmitting the third random access message during a time window that is based on the time period.

Figure 11:
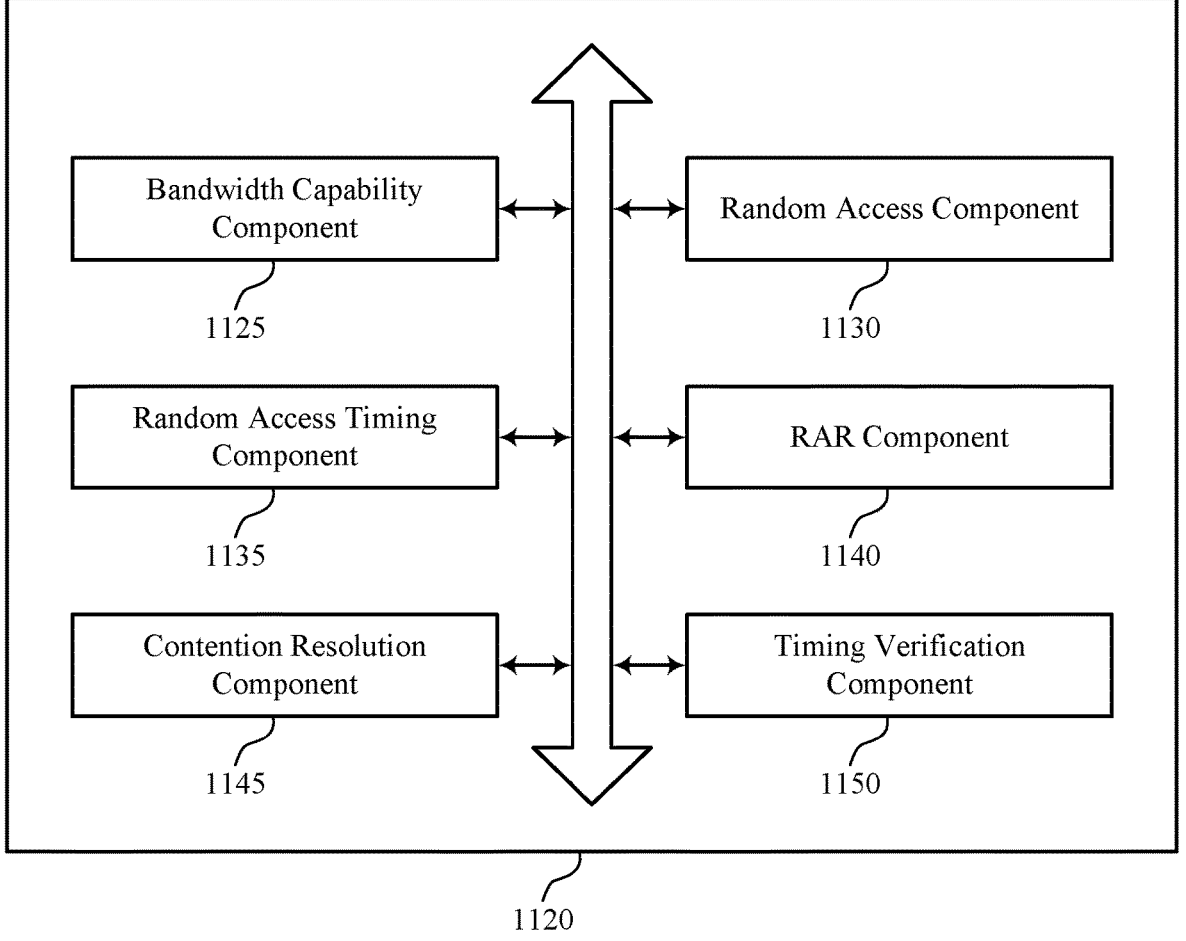
FIG. 11 illustrates a block diagram of a communications manager that supports a random access timeline for a reduced capability device in accordance with one or more aspects of the present disclosure.

FIG. 11 illustrates a block diagram 1100 of a communications manager 1120 that supports a random access timeline for a reduced capability device in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of a random access timeline for a reduced capability device as described herein. For example, the communications manager 1120 may include a bandwidth capability component 1125, a random access component 1130, a random access timing component 1135, a RAR component 1140, a contention resolution component 1145, a timing verification component 1150, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communication at a first network node in accordance with examples as disclosed herein. The bandwidth capability component 1125 may be configured as or otherwise support a means for receiving first information that is indicative of a bandwidth capability of a second network node. The random access component 1130 may be configured as or otherwise support a means for receiving a first random access message. The random access timing component 1135 may be configured as or otherwise support a means for transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

In some aspects, the random access component 1130 may be configured as or otherwise support a means for monitoring for the third random access message based on the time period.

In some aspects, the threshold time period may be based on a first time duration and an extension time. In some aspects, the first time duration may be based on a processing time associated with the second random access message, and the extension time may be based on the quantity of PRBs.

In some aspects, the quantity of PRBs of the second random access message may be within a particular range of PRB quantities, and the extension time may be based on the particular range of PRB quantities. In some aspects, the particular range of PRB quantities is from among a set of multiple ranges of PRB quantities within a system bandwidth. In some aspects, each range of PRB quantities of the set of multiple ranges of PRB quantities corresponds to a respective extension time.

In some aspects, one or more of the set of multiple ranges are defined by a respective maximum quantity of PRBs and a respective minimum quantity of PRBs. In some aspects, each range of PRB quantities of the set of multiple ranges of PRB quantities includes a same quantity of PRBs representative of a fraction of a total quantity of PRBs included in the set of multiple ranges of PRB quantities.

In some aspects, the extension time is based on a difference between the quantity of PRBs of the second random access message and a threshold quantity. In some aspects, the extension time is constant based on the quantity of PRBs of the second random access message being greater than a threshold quantity.

In some aspects, the time period is based on the threshold time period. In some aspects, the time period is greater than or equal to the threshold time period.

In some aspects, to support transmitting the second random access message, the RAR component 1140 may be configured as or otherwise support a means for transmitting, based on the first information and in response to the first random access message, the second random access message, where the second random access message is an RAR message that indicates the time period and that schedules an uplink message, where the time period is for transmission, by the second network node, of the scheduled uplink message, and where the third random access message is the scheduled uplink message.

In some aspects, to support transmitting the second random access message, the RAR component 1140 may be configured as or otherwise support a means for transmitting, based on the first information and in response to the first random access message, the second random access message, where the second random access message is an RAR message that indicates the time period and a random access preamble ID associated with a scheduled uplink message, where the time period is for transmission, by the second network node, of a retransmission of a random access preamble based on the random access preamble ID being different than an ID of the second network node, and where the first random access message is the random access preamble and the third random access message is the retransmission of the random access preamble.

In some aspects, to support transmitting the second random access message, the RAR component 1140 may be configured as or otherwise support a means for transmitting, based on the first information and in response to the first random access message, the second random access message, where the second random access message is an RAR message that indicates the time period and a success of a random access procedure, where the time period is for transmission, by the second network node, of a feedback message in response to the RAR message, and where the third random access message is the feedback message.

In some aspects, to support transmitting the second random access message, the contention resolution component 1145 may be configured as or otherwise support a means for transmitting, based on the first information and in response to the first random access message, the second random access message, where the second random access message is a downlink contention resolution random access message that indicates the time period, where the time period is for transmission, by the second network node, of a feedback message in response to the downlink contention resolution random access message, and where the third random access message is the feedback message.

In some aspects, the first random access message includes the first information indicative of the bandwidth capability of the second network node. In some aspects, the bandwidth capability of the second network node includes a reduced capability associated with a threshold quantity of PRBs that the second network node processes during a slot.

Additionally, or alternatively, the communications manager 1120 may support wireless communication at a first network node in accordance with examples as disclosed herein. In some aspects, the bandwidth capability component 1125 may be configured as or otherwise support a means for transmitting first information that is indicative of a bandwidth capability of the first network node. In some aspects, the random access component 1130 may be configured as or otherwise support a means for transmitting a first random access message. In some aspects, the random access timing component 1135 may be configured as or otherwise support a means for receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs. In some aspects, the random access component 1130 may be configured as or otherwise support a means for transmitting the third random access message during a time window that is based on the time period.

In some aspects, the timing verification component 1150 may be configured as or otherwise support a means for determining, based on receipt of the second random access message, whether the time period is greater than the threshold time period associated with the bandwidth capability of the first network node, where transmission of the third random access message is based on the time period being greater than the threshold time period.

In some aspects, the threshold time period is based on a first time duration and an extension time. In some aspects, the first time duration is based on a processing time associated with the second random access message, and the extension time is based on the quantity of PRBs.

In some aspects, the quantity of PRBs of the second random access message is within a particular range of PRB quantities, and the extension time is based on the particular range of PRB quantities. In some aspects, the particular range of PRB quantities is from among a set of multiple ranges of PRB quantities within a system bandwidth. In some aspects, each range of PRB quantities of the set of multiple ranges of PRB quantities corresponds to a respective extension time.

In some aspects, one or more of the set of multiple ranges are defined by a respective maximum quantity of PRBs and a respective minimum quantity of PRBs. In some aspects, each range of PRB quantities of the set of multiple ranges of PRB quantities includes a same quantity of PRBs representative of a fraction of a total quantity of PRBs included in the set of multiple ranges of PRB quantities.

In some aspects, the extension time is based on a difference between the quantity of PRBs of the second random access message and a threshold quantity. In some aspects, the extension time is constant based on the quantity of PRBs of the second random access message being greater than a threshold quantity.

In some aspects, to support receiving the second random access message, the RAR component 1140 may be configured as or otherwise support a means for receiving, based on the first information and in response to the first random access message, the second random access message, where the second random access message is an RAR message that indicates the time period and that schedules an uplink message, where time period is for transmission, by the first network node, of the scheduled uplink message, and where the third random access message is the scheduled uplink message.

In some aspects, to support receiving the second random access message, the RAR component 1140 may be configured as or otherwise support a means for receiving, based on the first information, the second random access message, where the second random access message is an RAR message that indicates the time period and a random access preamble ID associated with a scheduled uplink message, where the time period is for transmission, by the first network node, of a random access preamble based on the random access preamble ID being different than an ID of the first network node, and where the third random access message is the random access preamble.

In some aspects, to support receiving the second random access message, the RAR component 1140 may be configured as or otherwise support a means for receiving, based on the first information and in response to the first random access message, the second random access message, where the second random access message is an RAR message that indicates the time period and a success of a random access procedure, where the time period is for transmission, by the first network node, of a feedback message in response to the RAR message, and where the third random access message is the feedback message.

In some aspects, to support receiving the second random access message, the contention resolution component 1145 may be configured as or otherwise support a means for receiving, based on the first information and in response to the first random access message, the second random access message, where the second random access message is a downlink contention resolution random access message that indicates the time period, where the time period is for transmission, by the first network node, of a feedback message in response to the downlink contention resolution random access message, and where the third random access message is the feedback message.

In some aspects, the first random access message includes the first information indicative of the bandwidth capability of the first network node. In some aspects, the bandwidth capability of the first network node includes a reduced capability associated with a threshold quantity of PRBs that the first network node processes during a slot.

Figure 12:
FIG. 12 illustrates a diagram of a system including a UE that supports a random access timeline for a reduced capability device in accordance with one or more aspects of the present disclosure.

FIG. 12 illustrates a diagram of a system 1200 including a device 1205 that supports a random access timeline for a reduced capability device in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some aspects, the transceiver 1210 may include a wired transceiver and may communicate bi-directionally with another wired transceiver. Additionally, or alternatively, in some aspects, the transceiver 1210 may include a wireless transceiver and may communicate bi-directionally with another wireless transceiver. In some aspects, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. In some implementations, the transceiver 1210 may include one or more interfaces, such as one or more interfaces coupled with the one or more antennas 1215 that are configured to support various receiving or obtaining operations, or one or more interfaces coupled with the one or more antennas 1215 that are configured to support various transmitting or outputting operations, or a combination thereof. In some implementations, the transceiver 1210 may include or be configured for coupling with one or more processors or memory components that are operable to perform or support operations based on received or obtained information or signals, or to generate information or other signals for transmission or other outputting, or any combination thereof. In some implementations, the transceiver 1210, or the transceiver 1210 and the one or more antennas 1215, or the transceiver 1210 and the one or more antennas 1215 and one or more processors or memory components (for example, the processor 1235, or the memory 1225, or both), may be included in a chip or chip assembly that is installed in the device 1205. In some aspects, the transceiver may be operable to support communications via one or more communications links (e.g., a communication link 125, a backhaul communication link 120, a midhaul communication link 162, a fronthaul communication link 168).

The memory 1225 may include random access memory (RAM) and read-only memory (ROM). The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a basic input/output (I/O) system (BIOS) which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting a random access timeline for a reduced capability device). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205. The processor 1235 may be any one or more suitable processors capable of executing scripts or instructions of one or more software programs stored in the device 1205 (such as within the memory 1225). In some implementations, the processor 1235 may be a component of a processing system. A processing system may generally refer to a system or series of machines or components that receives inputs and processes the inputs to produce a set of outputs (which may be passed to other systems or components of, for example, the device 1205). For example, a processing system of the device 1205 may refer to a system including the various other components or subcomponents of the device 1205, such as the processor 1235, or the transceiver 1210, or the communications manager 1220, or other components or combinations of components of the device 1205. The processing system of the device 1205 may interface with other components of the device 1205, and may process information received from other components (such as inputs or signals) or output information to other components. For example, a chip or modem of the device 1205 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1205 may transmit information output from the chip or modem. Additionally, or alternatively, in some implementations, the one or more interfaces may refer to an interface between the processing system of the chip or modem and a receiver, such that the device 1205 may obtain information or signal inputs, and the information may be passed to the processing system. A person having ordinary skill in the art will readily recognize that a first interface also may obtain information or signal inputs, and a second interface also may output information or signal outputs.

In some aspects, a bus 1240 may support communications of (e.g., within) a protocol layer of a protocol stack. In some aspects, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some aspects, the communications manager 1220 may manage aspects of communications with a core network 130 (e.g., via one or more wired or wireless backhaul links). For example, the communications manager 1220 may manage the transfer of data communications for client devices, such as one or more UEs 115. In some aspects, the communications manager 1220 may manage communications with other network entities 105, and may include a controller or scheduler for controlling communications with UEs 115 in cooperation with other network entities 105. In some aspects, the communications manager 1220 may support an X2 interface within an LTE/LTE-A wireless communications network technology to provide communication between network entities 105.

The communications manager 1220 may support wireless communication at a first network node in accordance with examples as disclosed herein. For example, the communications manager 1220 may be configured as or otherwise support a means for receiving first information that is indicative of a bandwidth capability of a second network node. The communications manager 1220 may be configured as or otherwise support a means for receiving a first random access message. The communications manager 1220 may be configured as or otherwise support a means for transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

Additionally, or alternatively, the communications manager 1220 may support wireless communication at a first network node in accordance with examples as disclosed herein. For example, the communications manager 1220 may be configured as or otherwise support a means for transmitting first information that is indicative of a bandwidth capability of the first network node. The communications manager 1220 may be configured as or otherwise support a means for transmitting a first random access message. The communications manager 1220 may be configured as or otherwise support a means for receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs. The communications manager 1220 may be configured as or otherwise support a means for transmitting the third random access message during a time window that is based on the time period.

By including or configuring the communications manager 1220 in accordance with examples as described herein, the device 1205 may support techniques for improved communication reliability, reduced latency, reduced power consumption, more efficient utilization of communication resources, and improved coordination between devices.

In some aspects, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some aspects, one or more functions described with reference to the communications manager 1220 may be supported by or performed by the transceiver 1210, the processor 1235, the memory 1225, the code 1230, or any combination thereof. For example, the code 1230 may include instructions executable by the processor 1235 to cause the device 1205 to perform various aspects of a random access timeline for a reduced capability device as described herein, or the processor 1235 and the memory 1225 may be otherwise configured to perform or support such operations.

Figure 13:
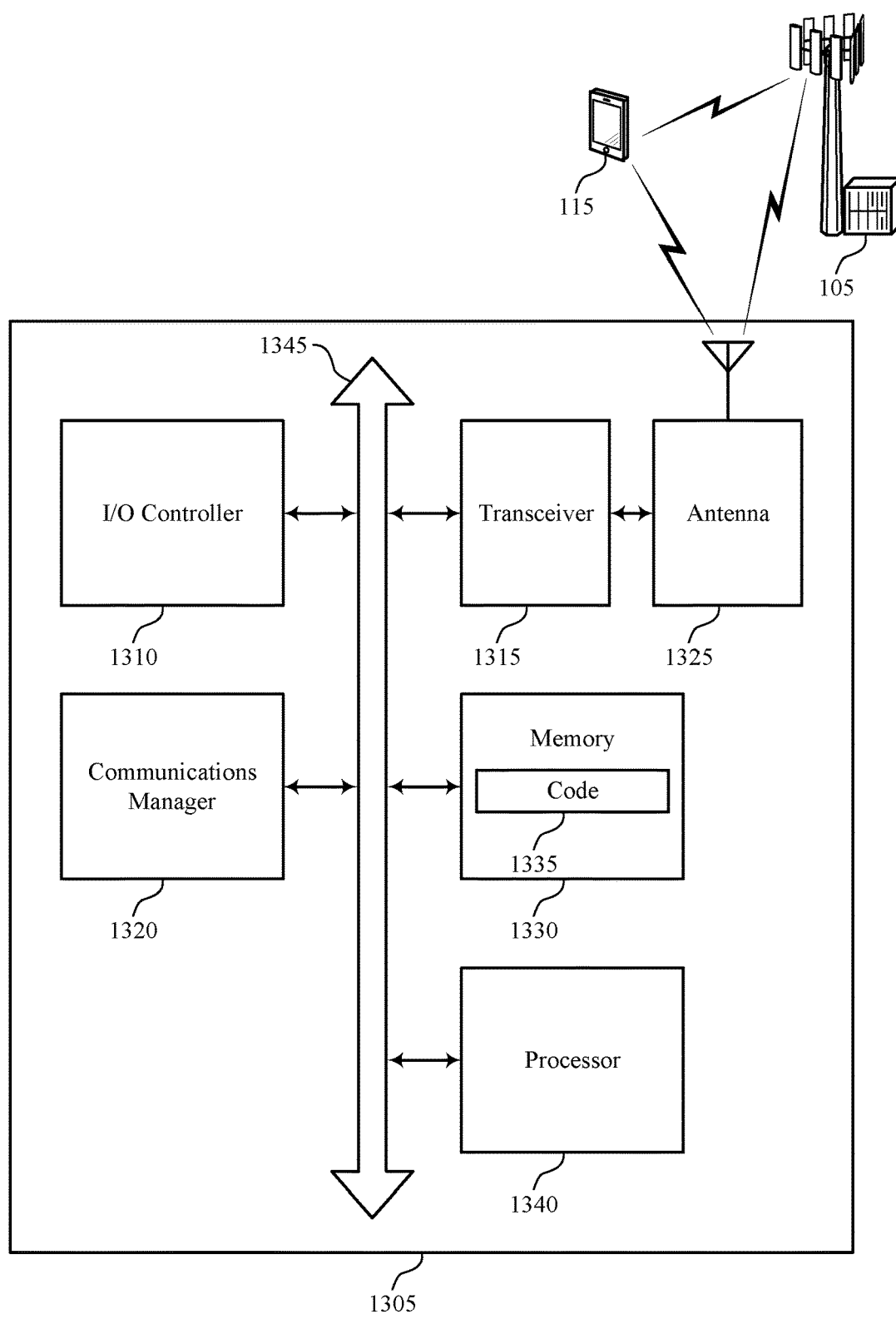
FIG. 13 illustrates a diagram of a system including a network entity that supports a random access timeline for a reduced capability device in accordance with one or more aspects of the present disclosure.

FIG. 13 illustrates a diagram of a system 1300 including a device 1305 that supports a random access timeline for a reduced capability device in accordance with one or more aspects of the present disclosure. The device 1305 may be an example of or include the components of a device 905, a device 1005, or a UE 115 as described herein. The device 1305 may communicate (e.g., wirelessly) with one or more network entities 105, one or more UEs 115, or any combination thereof. The device 1305 may include components for bi-directional voice and data communications including components for transmitting and receiving communications, such as a communications manager 1320, an I/O controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WIN-DOWS®, OS/2®, UNIX®, LINUX®), or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 915, a transmitter 1015, a receiver 910, a receiver 1010, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting a random access timeline for a reduced capability device). For example, the device 1305 or a component of the device 1305 may include a processor 1340 and memory 1330 coupled with or to the processor 1340, the processor 1340 and memory 1330 configured to perform various functions described herein.

The communications manager 1320 may support wireless communication at a first network node in accordance with examples as disclosed herein. For example, the communications manager 1320 may be configured as or otherwise support a means for receiving first information that is indicative of a bandwidth capability of a second network node. The communications manager 1320 may be configured as or otherwise support a means for receiving a first random access message. The communications manager 1320 may be configured as or otherwise support a means for transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs.

Additionally, or alternatively, the communications manager 1320 may support wireless communication at a first network node in accordance with examples as disclosed herein. For example, the communications manager 1320 may be configured as or otherwise support a means for transmitting first information that is indicative of a bandwidth capability of the first network node. The communications manager 1320 may be configured as or otherwise support a means for transmitting a first random access message. The communications manager 1320 may be configured as or otherwise support a means for receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs. The communications manager 1320 may be configured as or otherwise support a means for transmitting the third random access message during a time window that is based on the time period.

By including or configuring the communications manager 1320 in accordance with examples as described herein, the device 1305 may support techniques for improved communication reliability, reduced latency, reduced power consumption, more efficient utilization of communication resources, and improved coordination between devices.

In some aspects, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some aspects, one or more functions described with reference to the communications manager 1320 may be supported by or performed by the processor 1340, the memory

1330, the code 1335, or any combination thereof. For example, the code 1335 may include instructions executable by the processor 1340 to cause the device 1305 to perform various aspects of a random access timeline for a reduced capability device as described herein, or the processor 1340 and the memory 1330 may be otherwise configured to perform or support such operations.

FIG. 14 illustrates a flowchart showing a method 1400 that supports a random access timeline for a reduced capability device in accordance with one or more aspects of the present disclosure. The operations of the method 1400 may be implemented by a network entity or a UE or its components as described herein. For example, the operations of the method 1400 may be performed by a network entity or a UE 115 as described with reference to FIGS. 1 through 13. In some aspects, a network entity or a UE may execute a set of instructions to control the functional elements of the network entity or the UE to perform the described functions. Additionally, or alternatively, the network entity or the UE may perform aspects of the described functions using special-purpose hardware.

At 1405, the method may include receiving first information that is indicative of a bandwidth capability of a second network node. The operations of 1405 may be performed in accordance with examples as disclosed herein. In some aspects, aspects of the operations of 1405 may be performed by a bandwidth capability component 1125 as described with reference to FIG. 11.

At 1410, the method may include receiving a first random access message. The operations of 1410 may be performed in accordance with examples as disclosed herein. In some aspects, aspects of the operations of 1410 may be performed by a random access component 1130 as described with reference to FIG. 11.

At 1415, the method may include transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs. The operations of 1415 may be performed in accordance with examples as disclosed herein. In some aspects, aspects of the operations of 1415 may be performed by a random access timing component 1135 as described with reference to FIG. 11.

FIG. 15 illustrates a flowchart showing a method 1500 that supports a random access timeline for a reduced capability device in accordance with one or more aspects of the present disclosure. The operations of the method 1500 may be implemented by a network entity or a UE or its components as described herein. For example, the operations of the method 1500 may be performed by a network entity or a UE 115 as described with reference to FIGS. 1 through 13. In some aspects, a network entity or a UE may execute a set of instructions to control the functional elements of the network entity or the UE to perform the described functions. Additionally, or alternatively, the network entity or the UE may perform aspects of the described functions using special-purpose hardware.

At 1505, the method may include receiving first information that is indicative of a bandwidth capability of a second network node. The operations of 1505 may be performed in accordance with examples as disclosed herein. In some aspects, aspects of the operations of 1505 may be performed by a bandwidth capability component 1125 as described with reference to FIG. 11.

At 1510, the method may include receiving a first random access message. The operations of 1510 may be performed in accordance with examples as disclosed herein. In some aspects, aspects of the operations of 1510 may be performed by a random access component 1130 as described with reference to FIG. 11.

At 1515, the method may include transmitting, based on the first random access message and via a quantity of PRBs, a second random access message that indicates a time period for transmission, by the second network node, of a third random access message responsive to the second random access message, where the time period is based on a threshold time period associated with the bandwidth capability of the second network node, and where the threshold time period is based on the quantity of PRBs. The operations of 1515 may be performed in accordance with examples as disclosed herein. In some aspects, aspects of the operations of 1515 may be performed by a random access timing component 1135 as described with reference to FIG. 11.

At 1520, the method may include monitoring for the third random access message based on the time period. The operations of 1520 may be performed in accordance with examples as disclosed herein. In some aspects, aspects of the operations of 1520 may be performed by a random access component 1130 as described with reference to FIG. 11.

FIG. 16 illustrates a flowchart showing a method 1600 that supports a random access timeline for a reduced capability device in accordance with one or more aspects of the present disclosure. The operations of the method 1600 may be implemented by a network entity or a UE or its components as described herein. For example, the operations of the method 1600 may be performed by a network entity or a UE 115 as described with reference to FIGS. 1 through 13. In some aspects, a network entity or a UE may execute a set of instructions to control the functional elements of the network entity or the UE to perform the described functions. Additionally, or alternatively, the network entity or the UE may perform aspects of the described functions using special-purpose hardware.

At 1605, the method may include receiving first information that is indicative of a bandwidth capability of a second network node. The operations of 1605 may be performed in accordance with examples as disclosed herein. In some aspects, aspects of the operations of 1605 may be performed by a bandwidth capability component 1125 as described with reference to FIG. 11.

At 1610, the method may include receiving a first random access message. The operations of 1610 may be performed in accordance with examples as disclosed herein. In some aspects, aspects of the operations of 1610 may be performed by a random access component 1130 as described with reference to FIG. 11.

At 1615, the method may include transmitting, based on the first information, in response to the first random access message, and via a quantity of PRBs, a second random access message, where the second random access message is an RAR message that schedules an uplink message and that indicates a time period for transmission, by the second network node, of the scheduled uplink message, where the time period is based on a threshold time period associated with the bandwidth capability of the second network node, and where the threshold time period is based on the quantity of PRBs. The operations of 1615 may be performed in accordance with examples as disclosed herein. In some aspects, aspects of the operations of 1615 may be performed by an RAR component 1140 as described with reference to FIG. 11.

FIG. 17 illustrates a flowchart showing a method 1700 that supports a random access timeline for a reduced capability device in accordance with one or more aspects of the present disclosure. The operations of the method 1700 may be implemented by a network entity or a UE or its components as described herein. For example, the operations of the method 1700 may be performed by a network entity or a UE 115 as described with reference to FIGS. 1 through 13. In some aspects, a network entity or a UE may execute a set of instructions to control the functional elements of the network entity or the UE to perform the described functions. Additionally, or alternatively, the network entity or the UE may perform aspects of the described functions using special-purpose hardware.

At 1705, the method may include transmitting first information that is indicative of a bandwidth capability of the first network node. The operations of 1705 may be performed in accordance with examples as disclosed herein. In some aspects, aspects of the operations of 1705 may be performed by a bandwidth capability component 1125 as described with reference to FIG. 11.

At 1710, the method may include transmitting a first random access message. The operations of 1710 may be performed in accordance with examples as disclosed herein. In some aspects, aspects of the operations of 1710 may be performed by a random access component 1130 as described with reference to FIG. 11.

At 1715, the method may include receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs. The operations of 1715 may be performed in accordance with examples as disclosed herein. In some aspects, aspects of the operations of 1715 may be performed by a random access timing component 1135 as described with reference to FIG. 11.

At 1720, the method may include transmitting the third random access message during a time window that is based on the time period. The operations of 1720 may be performed in accordance with examples as disclosed herein. In some aspects, aspects of the operations of 1720 may be performed by a random access component 1130 as described with reference to FIG. 11.

FIG. 18 illustrates a flowchart showing a method 1800 that supports a random access timeline for a reduced capability device in accordance with one or more aspects of the present disclosure. The operations of the method 1800 may be implemented by a network entity or a UE or its components as described herein. For example, the operations of the method 1800 may be performed by a network entity or a UE 115 as described with reference to FIGS. 1 through 13. In some aspects, a network entity or a UE may execute a set of instructions to control the functional elements of the network entity or the UE to perform the described functions. Additionally, or alternatively, the network entity or the UE may perform aspects of the described functions using special-purpose hardware.

At 1805, the method may include transmitting first information that is indicative of a bandwidth capability of the first network node. The operations of 1805 may be performed in accordance with examples as disclosed herein. In some aspects, aspects of the operations of 1805 may be performed by a bandwidth capability component 1125 as described with reference to FIG. 11.

At 1810, the method may include transmitting a first random access message. The operations of 1810 may be performed in accordance with examples as disclosed herein. In some aspects, aspects of the operations of 1810 may be performed by a random access component 1130 as described with reference to FIG. 11.

At 1815, the method may include receiving, based on the first random access message and via a quantity of PRBs, a second random access message that indicates a time period for transmission, by the first network node, of a third random access message responsive to the second random access message, where the time period is based on a threshold time period associated with the bandwidth capability of the first network node, and where the threshold time period is based on the quantity of PRBs. The operations of 1815 may be performed in accordance with examples as disclosed herein. In some aspects, aspects of the operations of 1815 may be performed by a random access timing component 1135 as described with reference to FIG. 11.

At 1820, the method may include determining, based on receipt of the second random access message, whether the time period is greater than the threshold time period associated with the bandwidth capability of the first network node. The operations of 1820 may be performed in accordance with examples as disclosed herein. In some aspects, aspects of the operations of 1820 may be performed by a timing verification component 1150 as described with reference to FIG. 11.

At 1825, the method may include transmitting the third random access message during a time window that is based on the time period, where transmission of the third random access message is based on the time period being greater than the threshold time period. The operations of 1825 may be performed in accordance with examples as disclosed herein. In some aspects, aspects of the operations of 1825 may be performed by a random access component 1130 as described with reference to FIG. 11.

The following provides an overview of aspects of the present disclosure:

Aspect 1: A method for wireless communication at a first network node, comprising: receiving first information that is indicative of a bandwidth capability of a second network node: receiving a first random access message; and transmitting, based on the first random access message and via a quantity of PRBs, a second random access message that indicates a time period for transmission, by the second network node, of a third random access message responsive to the second random access message, wherein the time period is based on a threshold time period associated with the bandwidth capability of the second network node, and wherein the threshold time period is based on the quantity of PRBs.

Aspect 2: The method of aspect 1, further comprising: monitoring for the third random access message based on the time period.

Aspect 3: The method of any of aspects 1 through 2, wherein the threshold time period is based on a first time duration and an extension time, the first time duration is based on a processing time associated with the second random access message, and the extension time is based on the quantity of PRBs.

Aspect 4: The method of aspect 3, wherein the quantity of PRBs of the second random access message is within a particular range of PRB quantities, and the extension time is based on the particular range of PRB quantities.

Aspect 5: The method of aspect 4, wherein the particular range of PRB quantities is from among a plurality of ranges of PRB quantities within a system bandwidth, and each range of PRB quantities of the plurality of ranges of PRB quantities corresponds to a respective extension time.

Aspect 6: The method of aspect 5, wherein one or more of the plurality of ranges are defined by a respective maximum quantity of PRBs and a respective minimum quantity of PRBs.

Aspect 7: The method of aspect 5, wherein each range of PRB quantities of the plurality of ranges of PRB quantities comprises a same quantity of PRBs representative of a fraction of a total quantity of PRBs included in the plurality of ranges of PRB quantities.

Aspect 8: The method of aspect 3, wherein the extension time is based on a difference between the quantity of PRBs of the second random access message and a threshold quantity.

Aspect 9: The method of aspect 3, wherein the extension time is constant based on the quantity of PRBs of the second random access message being greater than a threshold quantity.

Aspect 10: The method of any of aspects 3 through 9, wherein the time period is based on the threshold time period, and the time period is greater than or equal to the threshold time period.

Aspect 11: The method of any of aspects 1 through 10, wherein transmitting the second random access message comprises: transmitting, based on the first information and in response to the first random access message, the second random access message, wherein the second random access message is an RAR message that indicates the time period and that schedules an uplink message, wherein the time period is for transmission, by the second network node, of the scheduled uplink message, and wherein the third random access message is the scheduled uplink message.

Aspect 12: The method of any of aspects 1 through 10, wherein transmitting the second random access message comprises: transmitting, based on the first information and in response to the first random access message, the second random access message, wherein the second random access message is an RAR message that indicates the time period and a random access preamble ID associated with a scheduled uplink message, wherein the time period is for transmission, by the second network node, of a retransmission of a random access preamble based on the random access preamble ID being different than an identifier of the second network node, and wherein the first random access message is the random access preamble and the third random access message is the retransmission of the random access preamble.

Aspect 13: The method of any of aspects 1 through 10, wherein transmitting the second random access message comprises: transmitting, based on the first information and in response to the first random access message, the second random access message, wherein the second random access message is an RAR message that indicates the time period and a success of a random access procedure, wherein the time period is for transmission, by the second network node, of a feedback message in response to the RAR message, and wherein the third random access message is the feedback message.

Aspect 14: The method of any of aspects 1 through 10, wherein transmitting the second random access message comprises: transmitting, based on the first information and in response to the first random access message, the second random access message, wherein the second random access message is a downlink contention resolution random access message that indicates the time period, wherein the time period is for transmission, by the second network node, of a feedback message in response to the downlink contention resolution random access message, and wherein the third random access message is the feedback message.

Aspect 15: The method of any of aspects 1 through 14, wherein the first random access message includes the first information indicative of the bandwidth capability of the second network node.

Aspect 16: The method of any of aspects 1 through 15, wherein the bandwidth capability of the second network node comprises a reduced capability associated with a threshold quantity of PRBs that the second network node processes during a slot.

Aspect 17: A method for wireless communication at a first network node, comprising: transmitting first information that is indicative of a bandwidth capability of the first network node: transmitting a first random access message: receiving, based on the first random access message and via a quantity of PRBs, a second random access message that indicates a time period for transmission, by the first network node, of a third random access message responsive to the second random access message, wherein the time period is based on a threshold time period associated with the bandwidth capability of the first network node, and wherein the threshold time period is based on the quantity of PRBs; and transmitting the third random access message during a time window that is based on the time period.

Aspect 18: The method of aspect 17, further comprising: determining, based on receipt of the second random access message, whether the time period is greater than the threshold time period associated with the bandwidth capability of the first network node, wherein transmission of the third random access message is based on the time period being greater than the threshold time period.

Aspect 19: The method of any of aspects 17 through 18, wherein the threshold time period is based on a first time duration and an extension time, the first time duration is based on a processing time associated with the second random access message, and the extension time is based on the quantity of PRBs.

Aspect 20: The method of aspect 19, wherein the quantity of PRBs of the second random access message is within a particular range of PRB quantities, and the extension time is based on the particular range of PRB quantities.

Aspect 21: The method of aspect 20, wherein the particular range of PRB quantities is from among a plurality of ranges of PRB quantities within a system bandwidth, and each range of PRB quantities of the plurality of ranges of PRB quantities corresponds to a respective extension time.

Aspect 22: The method of aspect 21, wherein one or more of the plurality of ranges are defined by a respective maximum quantity of PRBs and a respective minimum quantity of PRBs.

Aspect 23: The method of aspect 21, wherein each range of PRB quantities of the plurality of ranges of PRB quantities comprises a same quantity of PRBs representative of a fraction of a total quantity of PRBs included in the plurality of ranges of PRB quantities.

Aspect 24: The method of aspect 19, wherein the extension time is based on a difference between the quantity of PRBs of the second random access message and a threshold quantity.

Aspect 25: The method of aspect 19, wherein the extension time is constant based on the quantity of PRBs of the second random access message being greater than a threshold quantity.

Aspect 26: The method of any of aspects 17 through 25, wherein receiving the second random access message comprises: receiving, based on the first information and in response to the first random access message, the second random access message, wherein the second random access message is an RAR message that indicates the time period and that schedules an uplink message, wherein time period is for transmission, by the first network node, of the scheduled uplink message, and wherein the third random access message is the scheduled uplink message.

Aspect 27: The method of any of aspects 17 through 25, wherein receiving the second random access message comprises: receiving, based on the first information, the second random access message, wherein the second random access message is an RAR message that indicates the time period and a random access preamble ID associated with a scheduled uplink message, wherein the time period is for transmission, by the first network node, of a random access preamble based on the random access preamble ID being different than an ID of the first network node, and wherein the third random access message is the random access preamble.

Aspect 28: The method of any of aspects 17 through 25, wherein receiving the second random access message comprises: receiving, based on the first information and in response to the first random access message, the second random access message, wherein the second random access message is an RAR message that indicates the time period and a success of a random access procedure, wherein the time period is for transmission, by the first network node, of a feedback message in response to the RAR message, and wherein the third random access message is the feedback message.

Aspect 29: The method of any of aspects 17 through 25, wherein receiving the second random access message comprises: receiving, based on the first information and in response to the first random access message, the second random access message, wherein the second random access message is a downlink contention resolution random access message that indicates the time period, wherein the time period is for transmission, by the first network node, of a feedback message in response to the downlink contention resolution random access message, and wherein the third random access message is the feedback message.

Aspect 30: The method of any of aspects 17 through 29, wherein the first random access message includes the first information indicative of the bandwidth capability of the first network node.

Aspect 31: The method of any of aspects 17 through 30, wherein the bandwidth capability of the first network node comprises a reduced capability associated with a threshold quantity of PRBs that the first network node processes during a slot.

Aspect 32: A first network node for wireless communication, comprising a memory; and at least one processor coupled to the memory, wherein the at least one processor is configured to perform a method of any of aspects 1 through 16.

Aspect 33: An apparatus for wireless communication at a first network node, comprising at least one means for performing a method of any of aspects 1 through 16.

Aspect 34: A non-transitory computer-readable medium storing code for wireless communication at a first network node, the code comprising instructions executable by a processor to perform a method of any of aspects 1 through 16.

Aspect 35: A first network node for wireless communication, comprising a memory; and at least one processor coupled to the memory, wherein the at least one processor is configured to perform a method of any of aspects 17 through 31.

Aspect 36: An apparatus for wireless communication at a first network node, comprising at least one means for performing a method of any of aspects 17 through 31.

Aspect 37: A non-transitory computer-readable medium storing code for wireless communication at a first network node, the code comprising instructions executable by a processor to perform a method of any of aspects 17 through 31.

The methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the drawings, describes example configurations and does not represent all the examples that may be implemented or that are within the scope of the claims. The term "aspect" or "example" used herein means "serving as an aspect, example, instance, or illustration," and not "preferred" or "advantageous over other aspects." The detailed description includes specific details for the purpose of providing an understanding of the described techniques. These techniques, however, may be practiced without these specific details. In some instances, structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:

a memory; and at least one processor coupled to the memory, wherein the at least one processor is configured to:

receive a first random access message comprising first information that is indicative of a bandwidth capability of a second network node; and transmit, based on the first random access message and via a quantity of physical resource blocks that are within a particular range of physical resource block quantities, a second random access message that indicates a time period for transmission, by the second network node, of a third random access message responsive to the second random access message, wherein the time period is based on a threshold time period associated with the bandwidth capability of the second network node, and wherein the threshold time period is based on:

a first time duration that is based on a processing time associated with the second random access message; and a respective second time duration that is based on the particular range of physical resource block quantities.

2. The first network node of claim 1, wherein the at least one processor is further configured to:

monitor for the third random access message based on the time period.

3. The first network node of claim 1, wherein the particular range of physical resource block quantities is from among a plurality of ranges of physical resource block quantities within a system bandwidth, and each range of physical resource block quantities of the plurality of ranges of physical resource block quantities corresponds to a respective second time duration.

4. The first network node of claim 3, wherein one or more of the plurality of ranges are defined by a respective maximum quantity of physical resource blocks and a respective minimum quantity of physical resource blocks.

5. The first network node of claim 3, wherein each range of physical resource block quantities of the plurality of ranges of physical resource block quantities comprises a same quantity of physical resource blocks representative of a fraction of a total quantity of physical resource blocks included in the plurality of ranges of physical resource block quantities.

6. The first network node of claim 1, wherein the respective second time duration is based on a difference between the quantity of physical resource blocks of the second random access message and a threshold quantity.

7. The first network node of claim 1, wherein the respective second time duration is constant based on the quantity of physical resource blocks of the second random access message being greater than a threshold quantity.

8. The first network node of claim 1, wherein the time period is based on the threshold time period, and the time period is greater than or equal to the threshold time period.

9. The first network node of claim 1, wherein, to transmit the second random access message, the at least one processor is configured to:

transmit, based on the first information and in response to the first random access message, the second random access message, wherein the second random access message is a random access response message that indicates the time period and that schedules an uplink message, wherein the time period is for transmission, by the second network node, of the scheduled uplink message, and wherein the third random access message is the scheduled uplink message.

10. The first network node of claim 1, wherein, to transmit the second random access message, the at least one processor is configured to:

transmit, based on the first information and in response to the first random access message, the second random access message, wherein the second random access message is a random access response message that indicates the time period and a random access preamble identifier associated with a scheduled uplink message, wherein the time period is for transmission, by the second network node, of a retransmission of a random access preamble based on the random access preamble identifier being different than an identifier of the second network node, and wherein the first random access message is the random access preamble and the third random access message is the retransmission of the random access preamble.

11. The first network node of claim 1, wherein, to transmit the second random access message, the at least one processor is configured to:

transmit, based on the first information and in response to the first random access message, the second random access message, wherein the second random access message is a random access response message that indicates the time period and a success of a random access procedure, wherein the time period is for transmission, by the second network node, of a feedback message in response to the random access response message, and wherein the third random access message is the feedback message.

12. The first network node of claim 1, wherein, to transmit the second random access message, the at least one processor is configured to:

transmit, based on the first information and in response to the first random access message, the second random access message, wherein the second random access message is a downlink contention resolution random access message that indicates the time period, wherein the time period is for transmission, by the second network node, of a feedback message in response to the downlink contention resolution random access message, and wherein the third random access message is the feedback message.

13. The first network node of claim 1, wherein the first random access message includes the first information indicative of the bandwidth capability of the second network node.

14. The first network node of claim 1, wherein the bandwidth capability of the second network node comprises a reduced capability associated with a threshold quantity of physical resource blocks that the second network node processes during a slot.

15. A second network node for wireless communication, comprising:

a memory; and at least one processor coupled to the memory, wherein the at least one processor is configured to:

transmit a first random access message comprising first information that is indicative of a bandwidth capability of the second network node;

receive, based on the first random access message and via a quantity of physical resource blocks that are within a particular range of physical resource block quantities, a second random access message that indicates a time period for transmission, by the second network node, of a third random access message responsive to the second random access message, wherein the time period is based on a threshold time period associated with the bandwidth capability of the second network node, and wherein the threshold time period is based on:

a first time duration that is based on a processing time associated with the second random access message; and a respective second time duration that is based on the particular range of physical resource block quantities; and transmit the third random access message during a time window that is based on the time period.

16. The second network node of claim 15, wherein the at least one processor is further configured to:

determine, based on receipt of the second random access message, whether the time period is greater than the threshold time period associated with the bandwidth capability of the second network node, wherein transmission of the third random access message is based on the time period being greater than the threshold time period.

17. The second network node of claim 15, wherein the particular range of physical resource block quantities is from among a plurality of ranges of physical resource block quantities within a system bandwidth, and each range of physical resource block quantities of the plurality of ranges of physical resource block quantities corresponds to a respective second time duration.

18. The second network node of claim 17, wherein one or more of the plurality of ranges are defined by a respective maximum quantity of physical resource blocks and a respective minimum quantity of physical resource blocks.

19. The second network node of claim 17, wherein each range of physical resource block quantities of the plurality of ranges of physical resource block quantities comprises a same quantity of physical resource blocks representative of a fraction of a total quantity of physical resource blocks included in the plurality of ranges of physical resource block quantities.

20. The second network node of claim 15, wherein the respective second time duration is based on a difference between the quantity of physical resource blocks of the second random access message and a threshold quantity.

21. The second network node of claim 15, wherein the respective second time duration is constant based on the quantity of physical resource blocks of the second random access message being greater than a threshold quantity.

22. The second network node of claim 15, wherein, to receive the second random access message, the at least one processor is configured to:

receive, based on the first information and in response to the first random access message, the second random access message, wherein the second random access message is a random access response message that indicates the time period and that schedules an uplink message, wherein the time period is for transmission, by the second network node, of the scheduled uplink message, and wherein the third random access message is the scheduled uplink message.

23. The second network node of claim 15, wherein, to receive the second random access message, the at least one processor is configured to:

receive, based on the first information, the second random access message, wherein the second random access message is a random access response message that indicates the time period and a random access preamble identifier associated with a scheduled uplink message, wherein the time period is for retransmission, by the second network node, of a random access preamble based on the random access preamble identifier being different than an identifier of the second network node, and wherein the third random access message is the random access preamble.

24. The second network node of claim 15, wherein, to receive the second random access message, the at least one processor is configured to:

receive, based on the first information and in response to the first random access message, the second random access message, wherein the second random access message is a random access response message that indicates the time period and a success of a random access procedure, wherein the time period is for transmission, by the second network node, of a feedback message in response to the random access response message, and wherein the third random access message is the feedback message.

25. The second network node of claim 15, wherein, to receive the second random access message, the at least one processor is configured to:

receive, based on the first information and in response to the first random access message, the second random access message, wherein the second random access message is a downlink contention resolution random access message that indicates the time period, wherein the time period is for transmission, by the second network node, of a feedback message in response to the downlink contention resolution random access message, and wherein the third random access message is the feedback message.

26. The second network node of claim 15, wherein the first random access message includes the first information indicative of the bandwidth capability of the second network node.

27. The second network node of claim 15, wherein the bandwidth capability of the second network node comprises a reduced capability associated with a threshold quantity of physical resource blocks that the second network node processes during a slot.

28. A method for wireless communication at a first network node, comprising:

receiving a first random access message comprising first information that is indicative of a bandwidth capability of a second network node; and transmitting, based on the first random access message and via a quantity of physical resource blocks that are within a particular range of physical resource block quantities, a second random access message that indicates a time period for transmission, by the second network node, of a third random access message responsive to the second random access message, wherein the time period is based on a threshold time period associated with the bandwidth capability of the second network node, and wherein the threshold time period is based on:

a first time duration that is based on a processing time associated with the second random access message; and a respective second time duration that is based on the particular range of physical resource block quantities.

29. The method of claim 28, further comprising: monitoring for the third random access message based on the time period.

30. A method for wireless communication at a second network node, comprising:

transmitting a first random access message comprising first information that is indicative of a bandwidth capability of the second network node;

receiving, based on the first random access message and via a quantity of physical resource blocks that are within a particular range of physical resource block quantities, a second random access message that indicates a time period for transmission, by the second network node, of a third random access message responsive to the second random access message, wherein the time period is based on a threshold time period associated with the bandwidth capability of the second network node, and wherein the threshold time period is based on:

a first time duration that is based on a processing time associated with the second random access message; and a respective second time duration that is based on the particular range of physical resource block quantities; and transmitting the third random access message during a time window that is based on the time period.

31. The method of claim 30, further comprising: determining, based on receipt of the second random access message, whether the time period is greater than the threshold time period associated with the bandwidth capability of the second network node, wherein transmission of the third random access message is based on the time period being greater than the threshold time period.

* * * * *